(12) United States Patent
Nakanishi

(10) Patent No.: US 10,284,821 B2
(45) Date of Patent: May 7, 2019

(54) IMAGING APPARATUS AND IMAGING SYSTEM

(71) Applicant: CANON KABUSHIKI KAISHA, Tokyo (JP)

(72) Inventor: Toru Nakanishi, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 241 days.

(21) Appl. No.: 15/119,354

(22) PCT Filed: Feb. 2, 2015

(86) PCT No.: PCT/JP2015/000442
§ 371 (c)(1),
(2) Date: Aug. 16, 2016

(87) PCT Pub. No.: WO2015/125420
PCT Pub. Date: Aug. 27, 2015

(65) Prior Publication Data
US 2017/0019643 A1    Jan. 19, 2017

(30) Foreign Application Priority Data

Feb. 19, 2014  (JP) .................. 2014-029835
Feb. 19, 2014  (JP) .................. 2014-029837

(51) Int. Cl.
| | | |
|---|---|---|
| H04N 5/77 | (2006.01) |
| H04N 7/18 | (2006.01) |
| H04N 5/232 | (2006.01) |
| H04N 19/85 | (2014.01) |
| H04N 21/2343 | (2011.01) |

(52) U.S. Cl.
CPC ......... *H04N 7/183* (2013.01); *H04N 5/23206* (2013.01); *H04N 7/18* (2013.01); *H04N 19/85* (2014.11); *H04N 21/2343* (2013.01)

(58) Field of Classification Search
USPC .................................. 348/143; 386/223–224
See application file for complete search history.

(56) References Cited

U.S. PATENT DOCUMENTS 7,738,011 B2 *  6/2010  Ito ..................... H04N 5/23206
                                                   348/207.11
2003/0184651 A1 * 10/2003 Ohsawa ............. H04N 1/00307
                                                    348/207.1

(Continued)

FOREIGN PATENT DOCUMENTS

JP    2012-227602 A    11/2012
WO    2013/175979 A1   11/2013

*Primary Examiner* — Nigar Chowdhury
(74) *Attorney, Agent, or Firm* — Canon U.S.A., Inc. I.P. Division

(57) ABSTRACT

In a case where an Add VideoEncoderConfiguation command received by a communication unit 1005 includes a second identifier and a VideoEncoderConfiguration stored in a storage unit 1002 is added to a media profile stored in the storage unit 1002, an imaging apparatus removes the VideoEncoderConfiguration from the MediaProflie stored in the storage unit 1002 and reads a VideoEncoderConfiguration2 associated with the second identifier, which the command received by the communication unit 1005 includes, from the storage unit 1002, and adds the read VideoEncoderConfiguration2 to the MediaProflie stored in the storage unit 1002.

6 Claims, 19 Drawing Sheets

(56) References Cited

U.S. PATENT DOCUMENTS

| | | | |
|---|---|---|---|
| 2004/0056964 A1* | 3/2004 | Kawai | H04N 5/23203 348/211.1 |
| 2004/0223191 A1* | 11/2004 | Murata | H04N 5/232 358/451 |
| 2008/0201451 A1* | 8/2008 | Yu | H04L 29/06 709/219 |
| 2010/0118180 A1* | 5/2010 | Matsushita | H04N 5/232 348/372 |
| 2011/0145305 A1* | 6/2011 | Kamei | G06F 17/30038 707/822 |
| 2011/0296394 A1* | 12/2011 | Vidal | G06F 8/453 717/171 |
| 2012/0328171 A1* | 12/2012 | Vitt | G06K 9/00979 382/124 |
| 2013/0093907 A1 | 4/2013 | Niida | |
| 2013/0329067 A1 | 12/2013 | Niida | |

* cited by examiner

[Fig. 1]
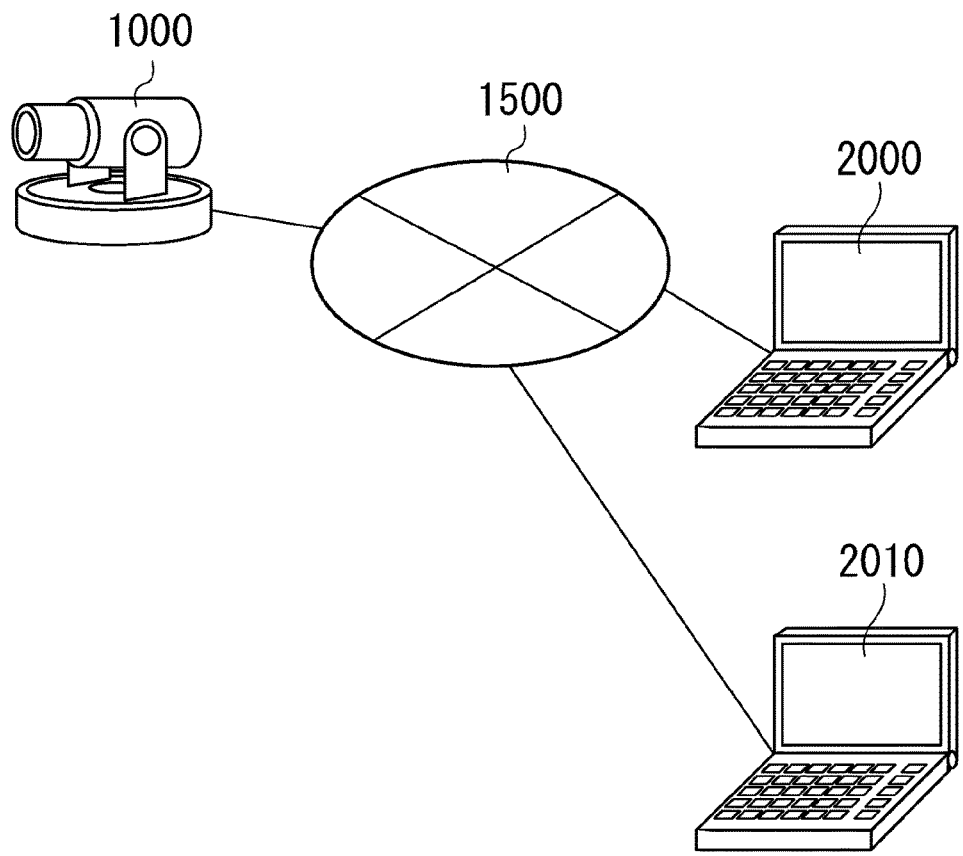
[Fig. 2]
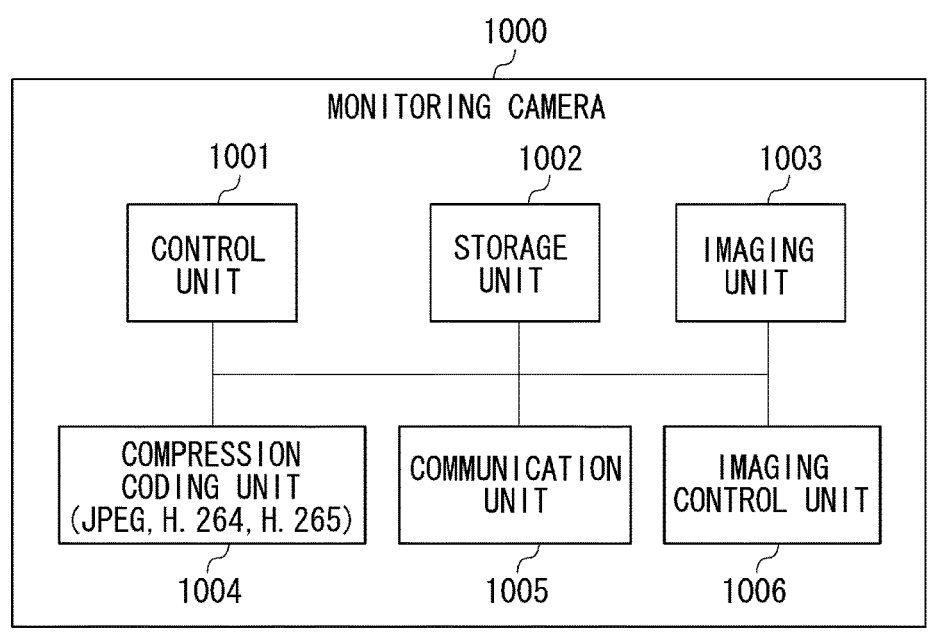

[Fig. 3]
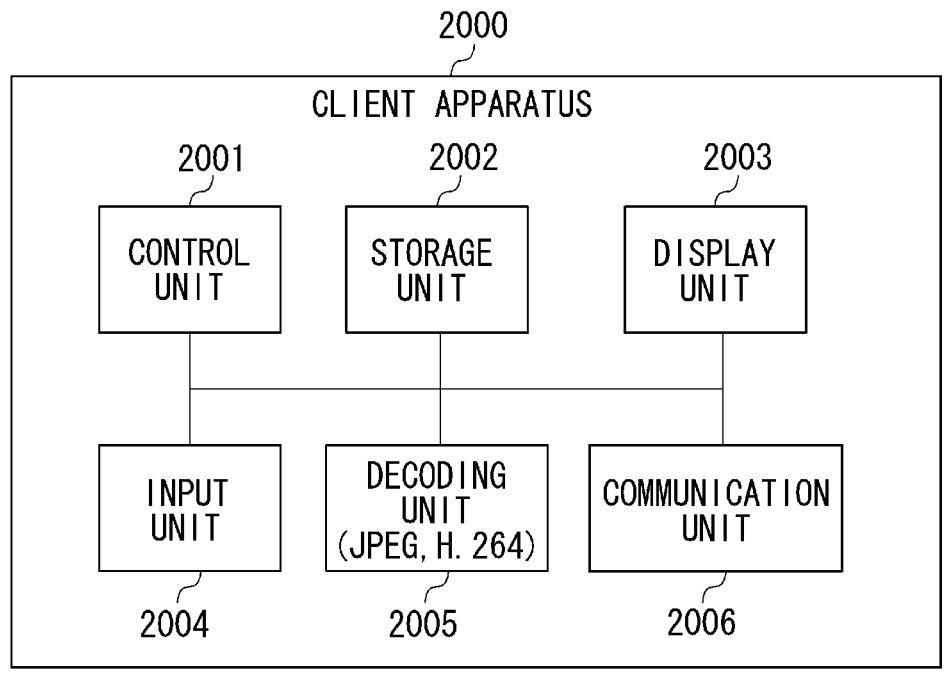
[Fig. 4]
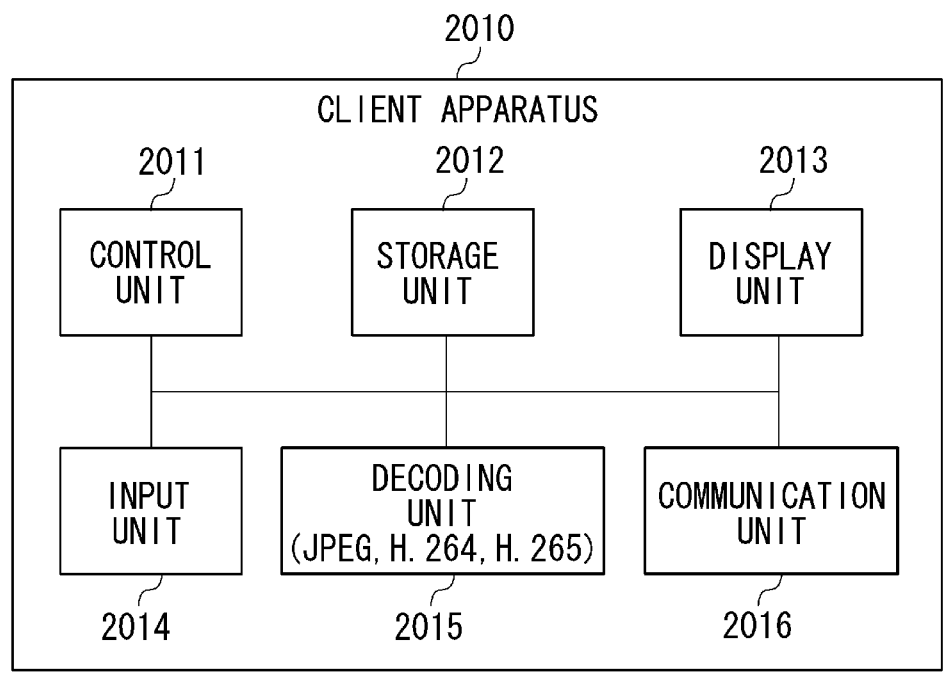

[Fig. 5]
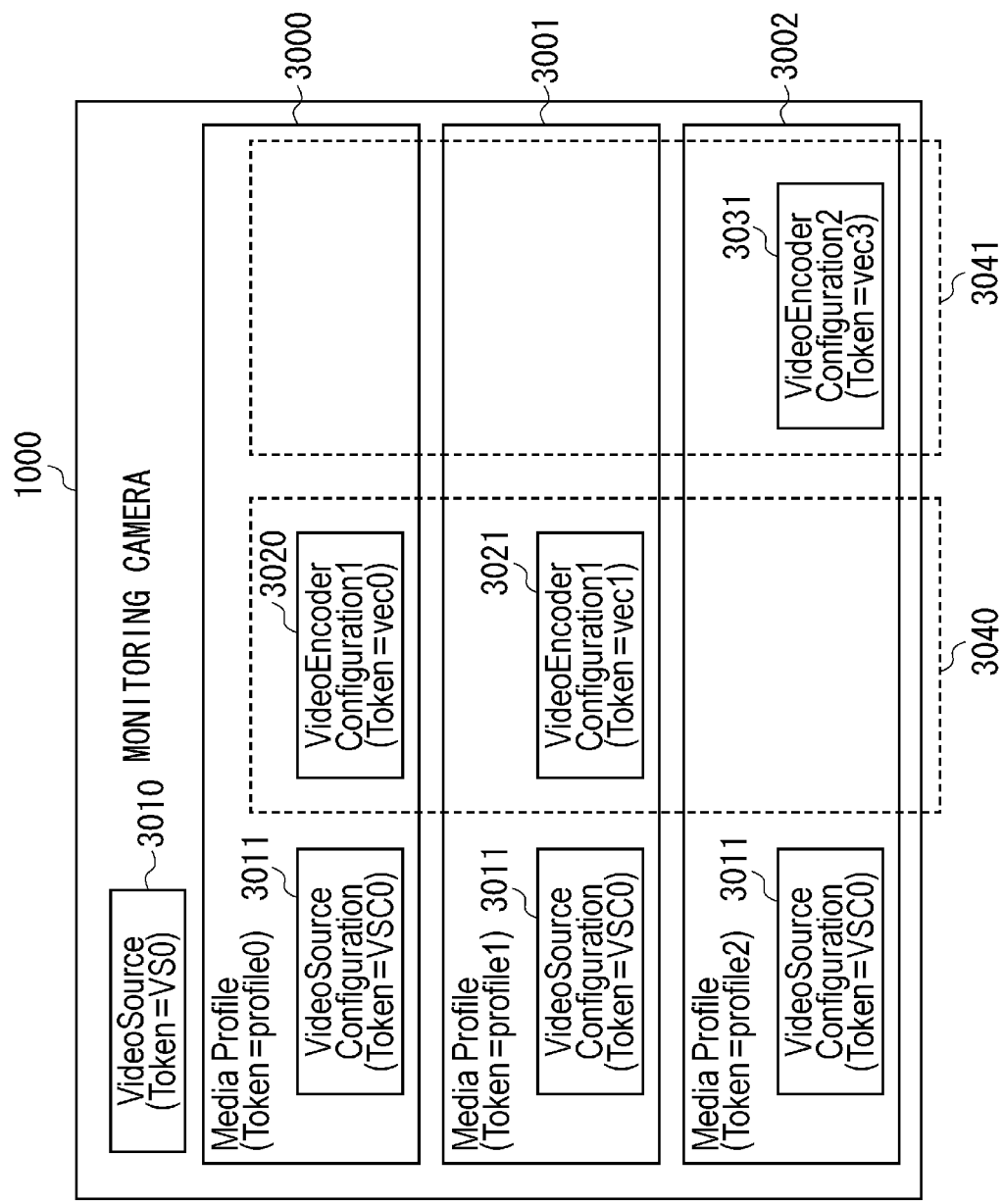

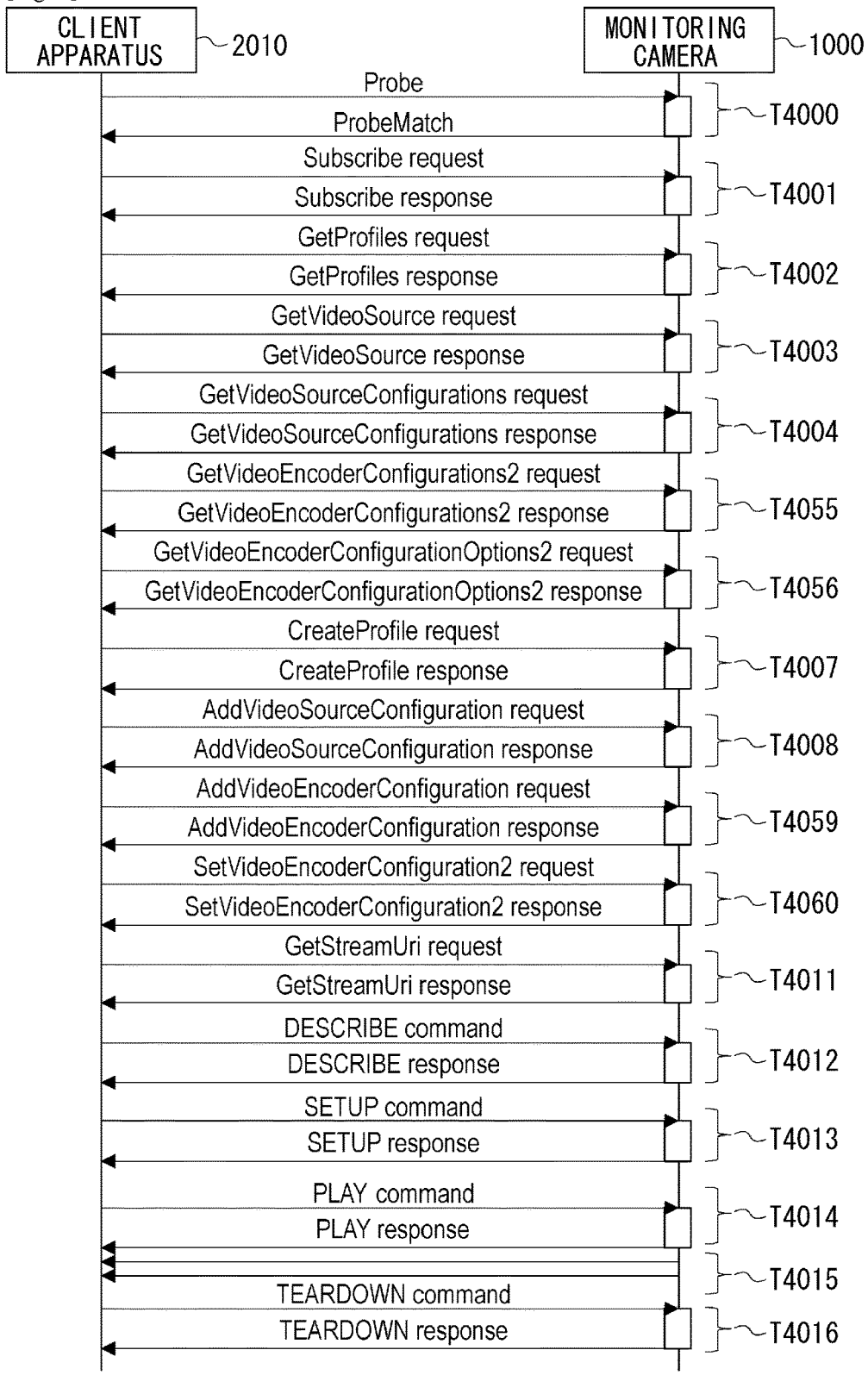

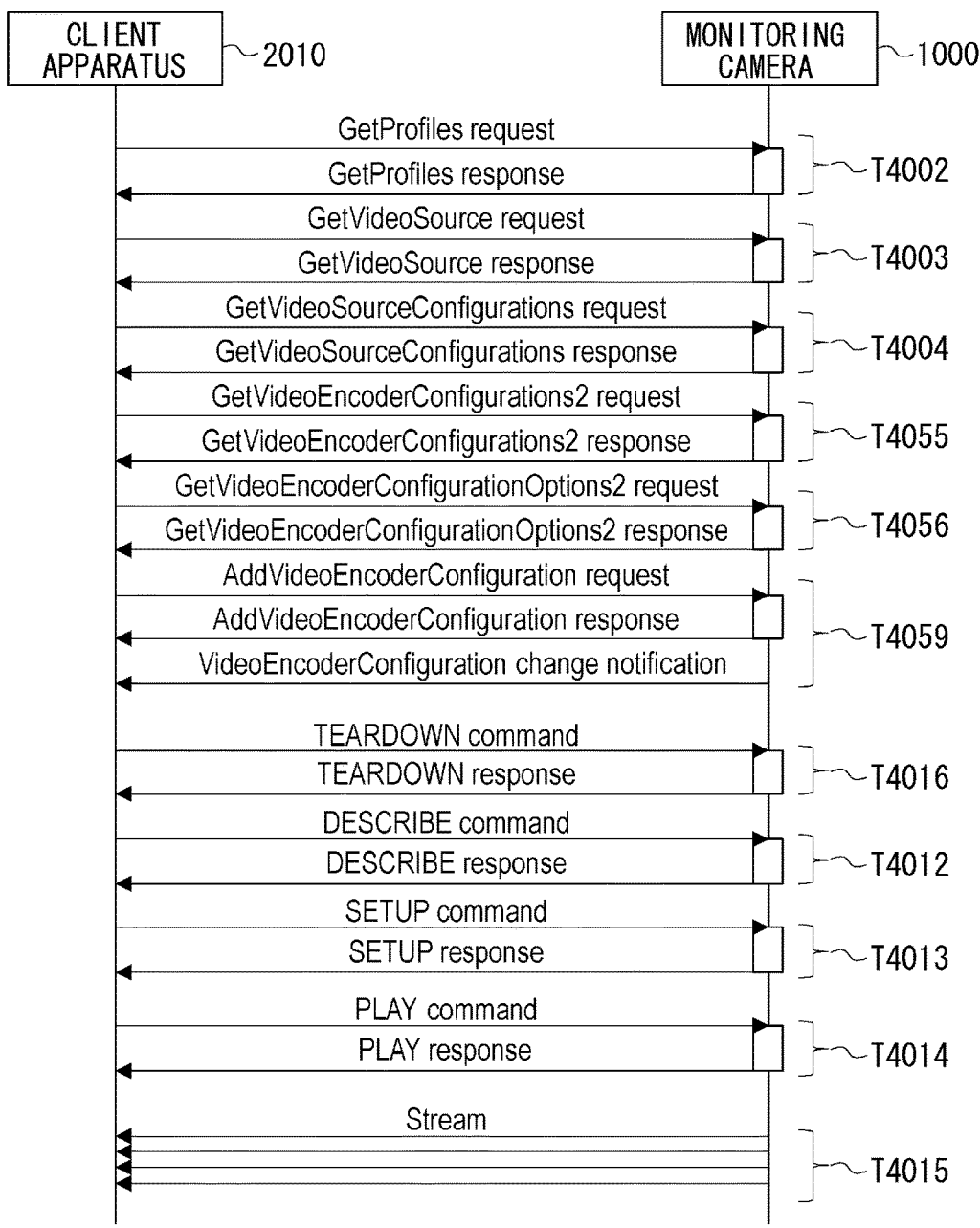
[Fig. 7]

[Fig. 8]
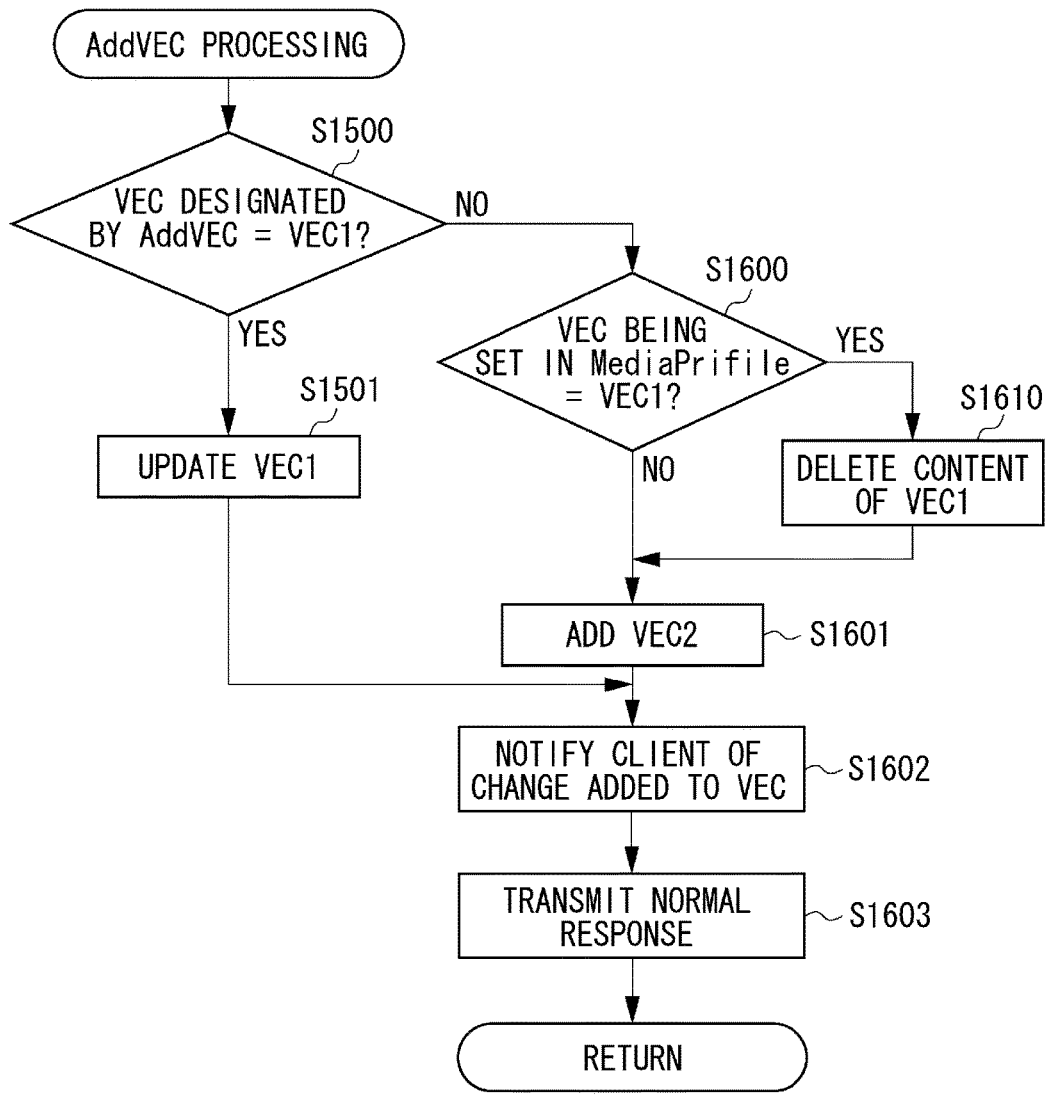

[Fig. 9]
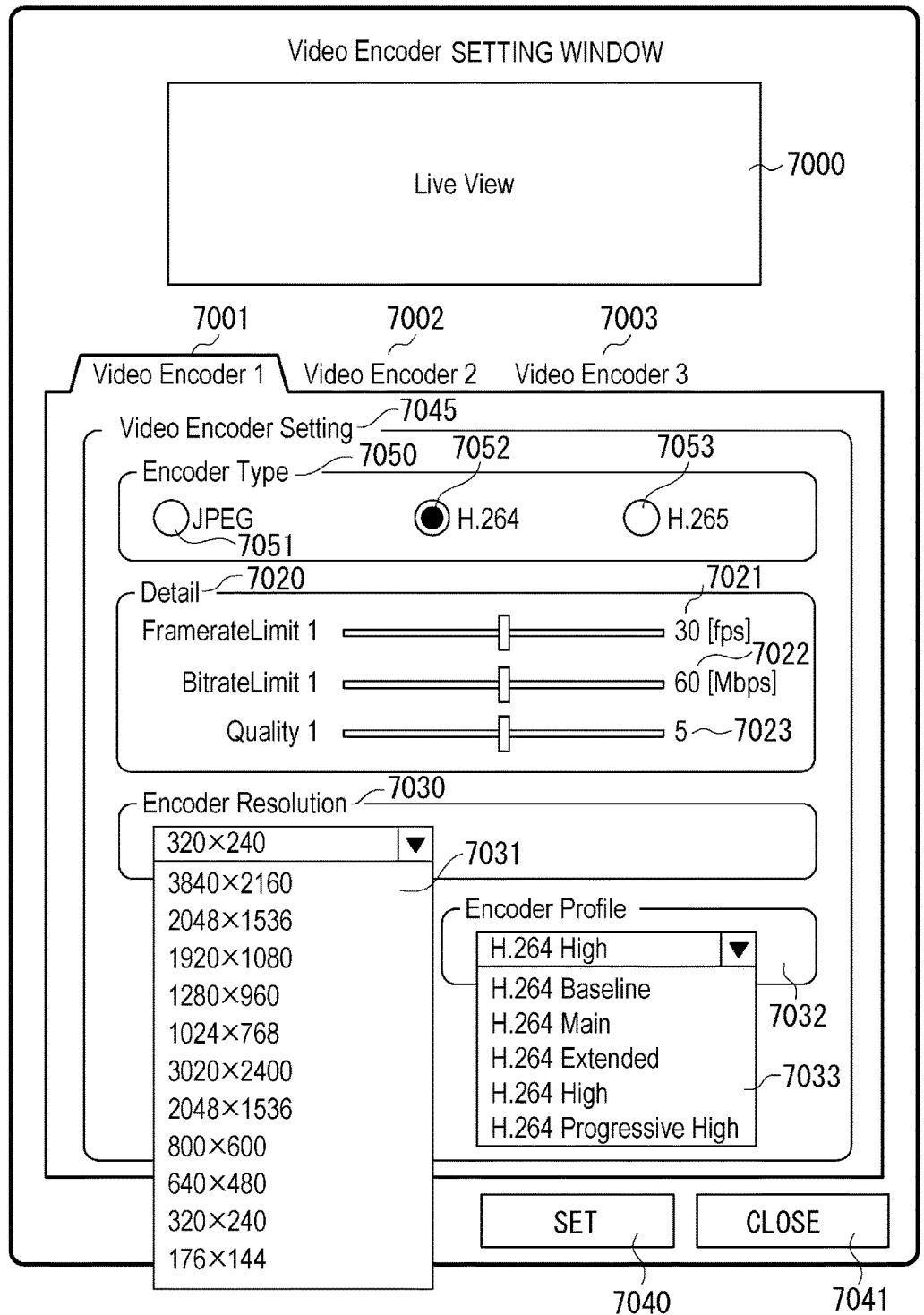

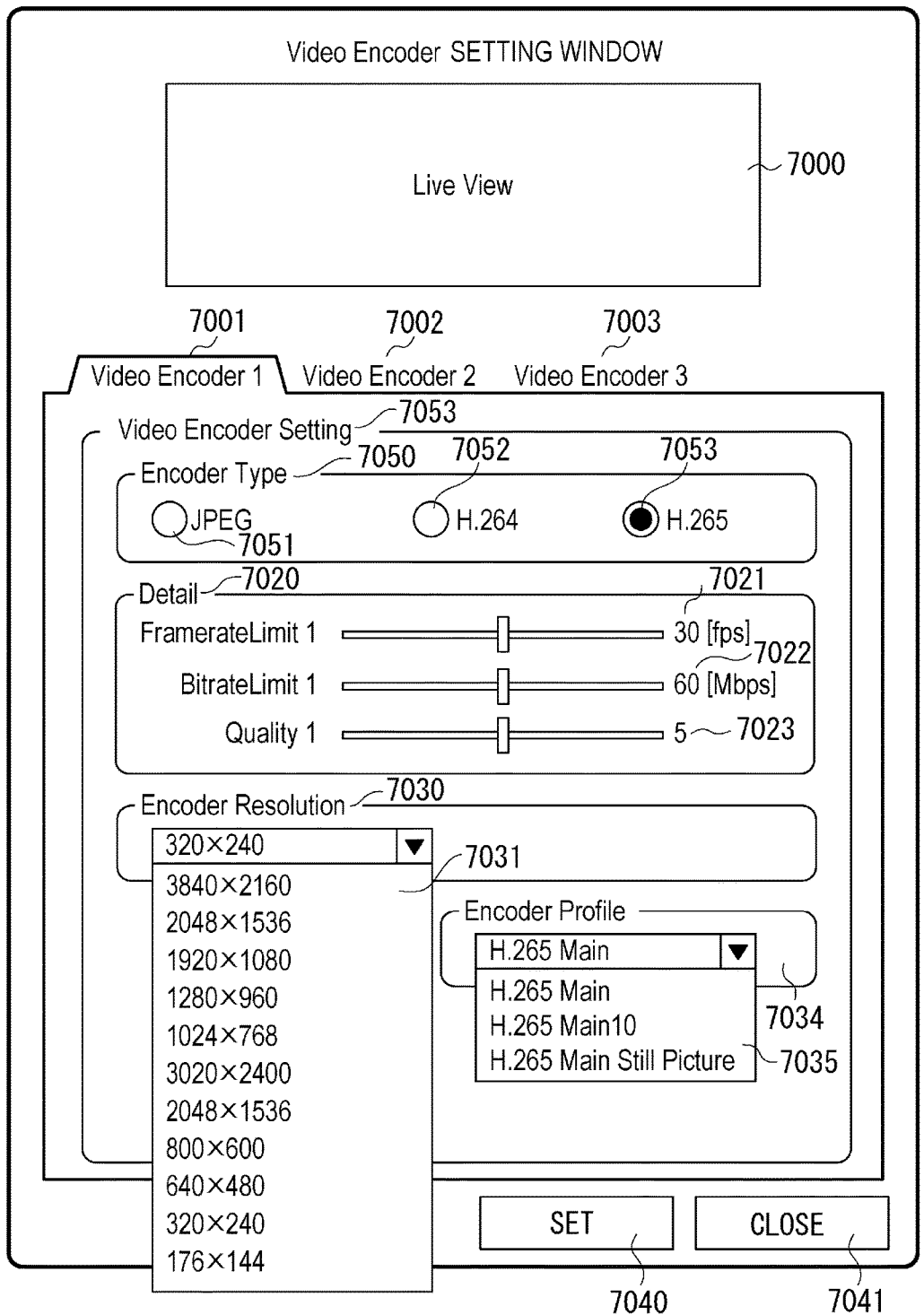
[Fig. 10]

[Fig. 11]
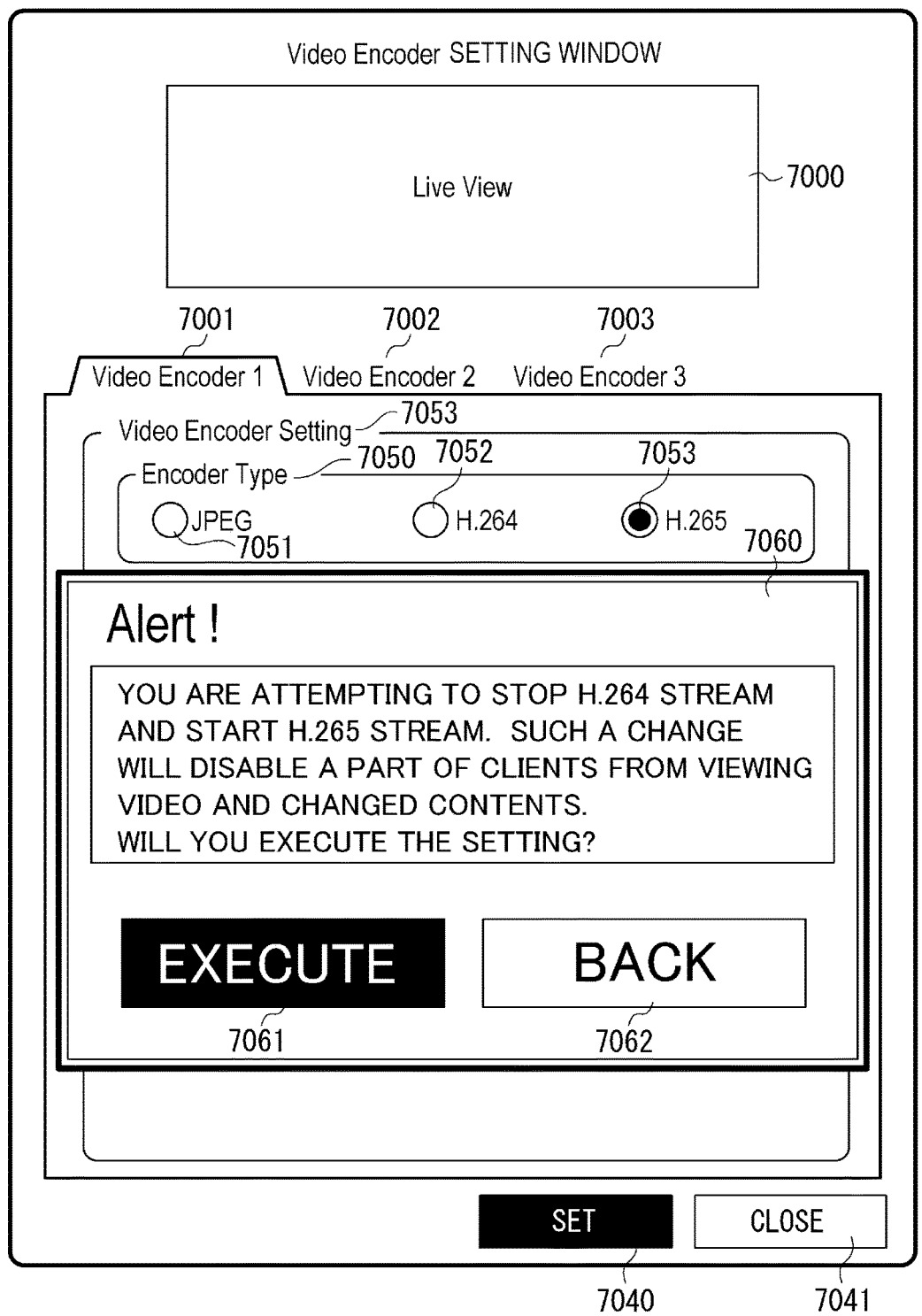

[Fig. 12]
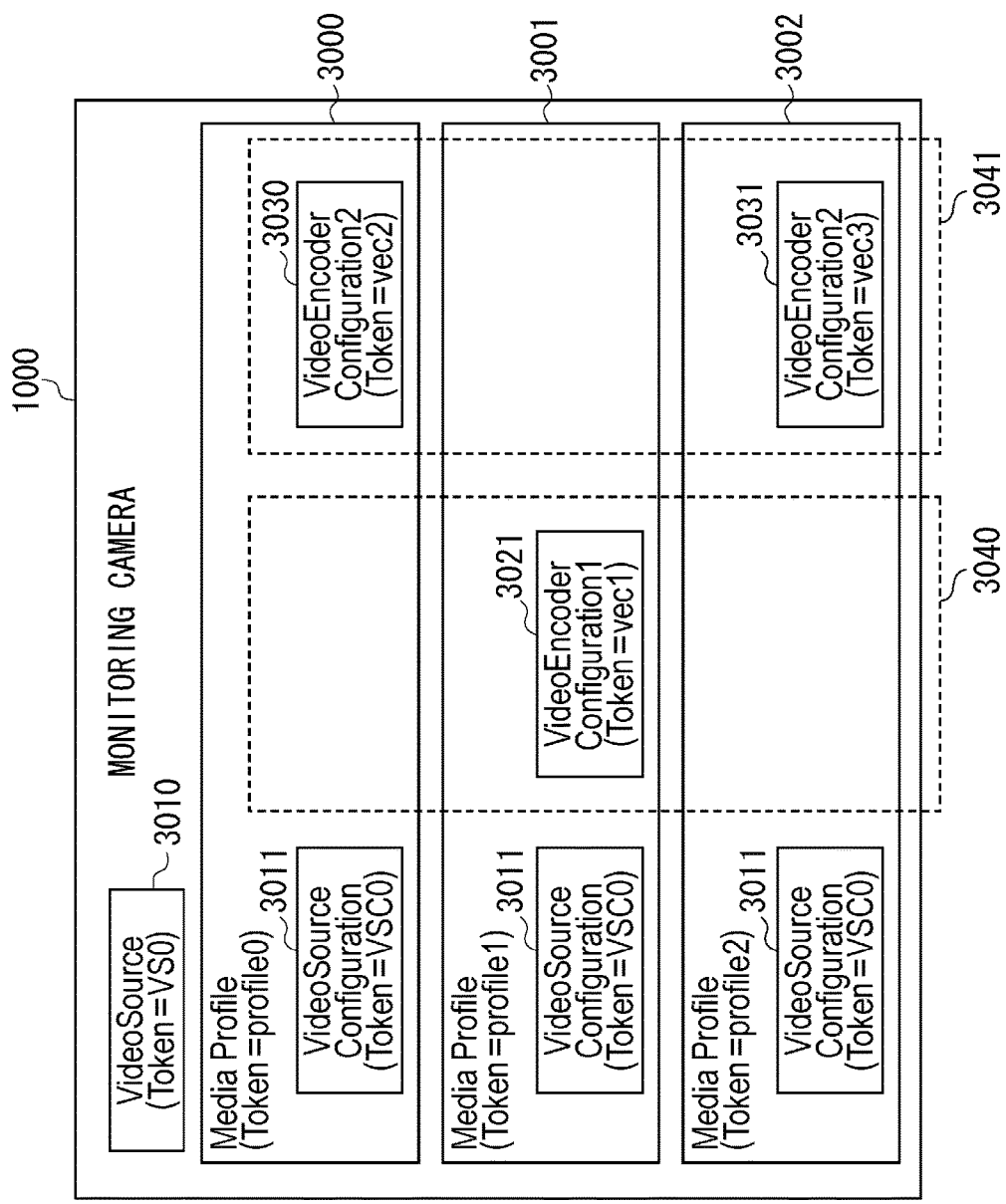

[Fig. 13]

```
<s:Envelope
        xmlns:a ="http://www.w3.org/2005/08/addressing"
        xmlns:s ="http://www.w3.org/2003/05/soap-envelope">
 <s:Header>
  ...
 </s:Header>
 <s:Body
        xmlns:xsi ="http://www.w3.org/2001/XMLSchema-instance"
        xmlns:xsd ="http://www.w3.org/2001/XMLSchema">
  <GetProfile
        xmlns ="http://www.onvif.org/ver10/media/wsdl">
   <ProfileToken>profile0</ProfileToken>
  </GetProfile>
 </s:Body>
</s:Envelope>
```

[Fig. 14]

```
<SOAP-ENV:Envelope
...
xmlns.tt="http://www.onvif.org/ver10/schema"
xmlns.trt="http://www.onvif.org/ver10/media/wsdl"
...
>
 <SOAP-ENV:Header>
  ...
 </SOAP-ENV:Header>
 <SOAP-ENV:Body>
  <trt:GetProfile Response>
   <trt:Profile fixed="false"token="profile0">
    <tt:Name>profile1</tt:Name>
    <tt:VideoSourceConfiguration token="0">
    ...
    </tt:VideoSourceConfiguration>
    <tt:AudioSourceConfiguration token="0">
    ...
    </tt:AudioSourceConfiguration>
    <tt:AudioEncoderConfiguration token="0">
    ...
    </tt:AudioEncoderConfiguration>
    <tt:VideoAnalyticsConfiguration token="0">
    ...
    </tt:VideoAnalyticsConfiguration>
    <tt:PTZConfiguration token="0">
    ...
    </tt:PTZConfiguration>
    <tt:MetadataConfiguration token="1">
    ...
    </tt:MetadataConfiguration>
    <tt:Extension>
     <tt:AudioOutputConfiguration token="0">
     ...
     </tt:AudioOutputConfiguration>
     <tt:AudioDecoderConfiguration token="0">
     ...
     </tt:AudioDecoderConfiguration>
     <tt:Extension>
      <tt:VideoEncoderConfiguration2 token="vec2">     ~10000
       <tt:Name>h265</tt:Name>
       <tt:UseCount>1</tt:UseCount>
       <tt:Encoding>H265</tt:Encoding>
       <tt:Resolution>
        <tt:Width>480</tt:Width>
        <tt:Height>270</tt:Height>
       </tt:Resolution>
       <tt:Quality>3.000000</tt:Quality>
       <tt:RateControl>
        <tt:FrameRateLimit>30</tt:FrameRateLimit>
        <tt:EncodingInterval>1</tt:EncodingInterval>
        <tt:BitrateLimit>2048</tt:BitrateLimit>
       </tt:RateControl>
       <tt:H265>
        <tt:GovLength>15</tt:GovLength>
        <tt:H265Profile>Main</tt:H265Profile>
       </tt:H265>
       <tt:Multicast>
        <tt:Address>
         <tt:Type>IPv4</tt:Type>
         <tt:IPv4Address>0.0.0.0</tt:IPv4Address>
        </tt:Address>
        <tt:Port>0</tt:Port>
        <tt:TTL>0</tt:TTL>
        <tt:AutoStart>false</tt:AutoStart>
       </tt:Multicast>
       <tt:SessionTimeout>PT1M0S</tt:SessionTimeout>
      </tt:VideoEncorderConfiguration2>
     </tt:Extention>
    </tt:Extention>
   </trt:Profile>
  </trt:GetProfileResponse>
 </SOAP-ENV:Body>
</SOAP-ENV:Envelope>
```

[Fig. 15]

```
<s:Envelope
        xmlns:a=http://www.w3.org/2005/08/addressing"
        xmlns:s="http://www.w3.org/2003/05/soap-envelope">
  <s:Header>
  ...
  </s:Header>
  <s:Body
        xmlns:xsi="http://www.w3.org/2001/XMLSchema-instance"
        xmlns:xsd="http:/www.w3.org/2001/XMLSchema">
    <AddVideoEncoderConfiguration
        xmlns="http://www.onvif.org/ver10/media/wsdl">
      <ProfileToken>Profile0</ProfileToken>            ~10001
      <ConfigurationToken>vec2</ConfigurationToken>
    </AddVideoEncoderConfiguration>
  </s:Body>
</s:Envelope>
```

[Fig. 16]

| Token OF VEC | TYPE OF VEC |
|---|---|
| vec0 | VEC1 |
| vec1 | VEC1 |
| vec2 | VEC2 |
| vec3 | VEC2 |

[Fig. 17]

```
<xs:complexType name="Profile">
    <xs:sequence>
        <xs:element name="Name" type="tt:Name"/>
        <xs:element name="VideoSourceConfiguration" type="tt:VideoSourceConfiguration" minOccurs="0"/>
        <xs:element name="AudioSourceConfiguration" type="tt:AudioSourceConfiguration" minOccurs="0"/>
        <xs:element name="VideoEncoderConfiguration" type="tt:VideoEncoderConfiguration" minOccurs="0"/>
        <xs:element name="AudioEncoderConfiguration" type="tt:AudioEncoderConfiguration" minOccurs="0"/>
        <xs:element name="VideoAnalyticsConfiguration" type="tt:VideoAnalyticsConfiguration" minOccurs="0"/>
        <xs:element name="PTZConfiguration" type="tt:PTZConfiguration" minOccurs="0"/>
        <xs:element name="MetadataConfiguration" type="tt:MetadataConfiguration" minOccurs="0"/>
        <xs:element name="Extension" type="tt:ProfileExtension" minOccurs="0"/>
        <xs:attribute name="token" type="tt:ReferenceToken" use="required"/>
        <xs:attribute name="fixed" type="xs:boolean"/>
    </xs:sequence>
</xs:complexType>

<xs:complexType name="ProfileExtension">
    <xs:sequence>
        <xs:element name="AudioOutputConfiguration" type="tt:AudioOutputConfiguration" minOccurs="0"/>
        <xs:element name="AudioDecoderConfiguration" type="tt:AudioDecoderConfiguration" minOccurs="0"/>
        <xs:element name="Extension" type="tt:ProfileExtension2" minOccurs="0"/>
    </xs:sequence>
</xs:complexType>

<xs:complexType name="ProfileExtension2">
    <xs:sequence>
        <xs:element name="VideoEncoderConfiguration2" minOccurs="0"/>
    </xs:sequence>
</xs:complexType>
```

[Fig. 18]

```
<xs:complexType name="VideoEncoderConfiguration2">
 <xs:sequence>
  <xs:element type name="Encoding" type="xs:string"/>
  <xs:element type name="Resolution" type="tt:VideoResultion2"/>
  <xs:element type name="Quality" type="xs:float"/>
  <xs:element type name="RateControl" type="tt:VideoRateControl2"/>
  <xs:element type name="Multicast" type="tt:MulticastConfiguration"/>
  <xs:element type name="SessionTimeout" type="xs:duration"/>
 </xs:sequence>
 <xs:attribute name="GovLength" type="xs:int">
 <xs:attribute name="EncodingProfile" type="xs:string">
</xs:complexType>

<xs:complexType name="VideoResolution2">
        <xs:sequence>
                <xs:element name="Width" type="xs:int"/>
                <xs:element name="Height" type="xs:int"/>
        </xs:sequence>
</xs:complexType>

<xs:complexType name="VideoRateControl2">
        <xs:sequence>
                <xs:element name="FrameRateLimit" type="xs:int"/>
                <xs:element name="EncodingInterval" type="xs:int"/>
                <xs:element name="BitrateLimit" type="xs:int"/>
        </xs:sequence>
</xs:complexType>
```

[Fig. 19A]
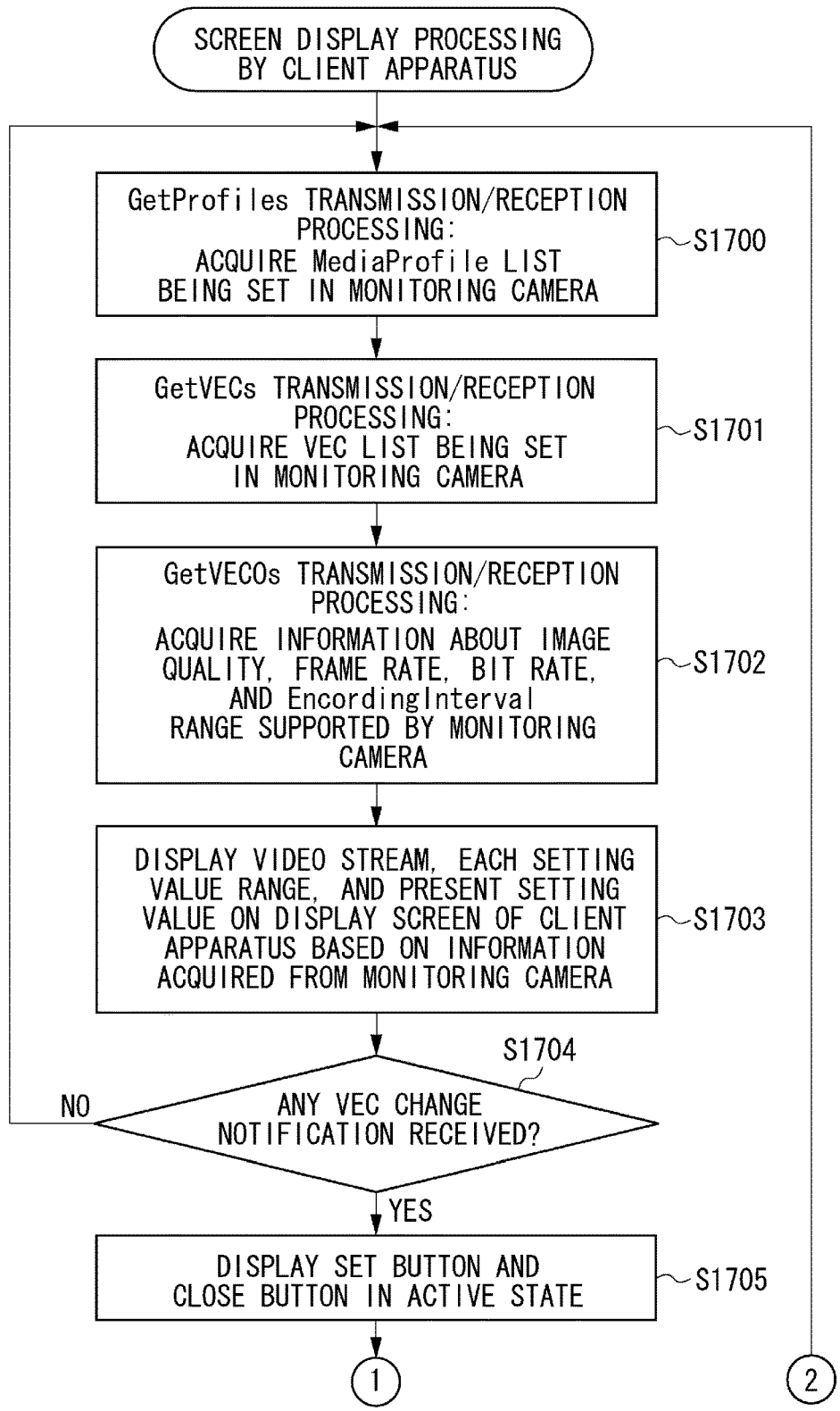

[Fig. 19B]
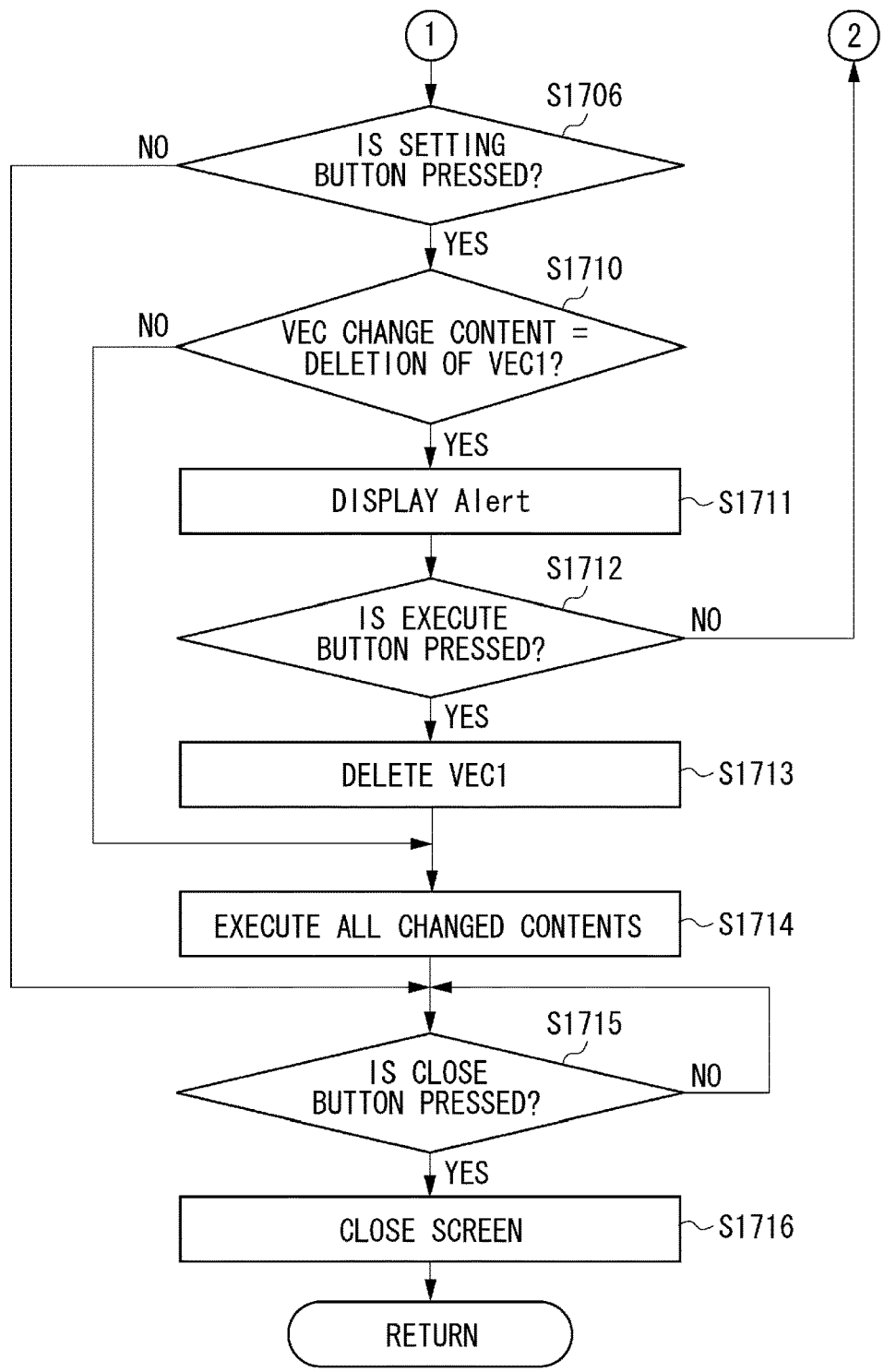

[Fig. 20]
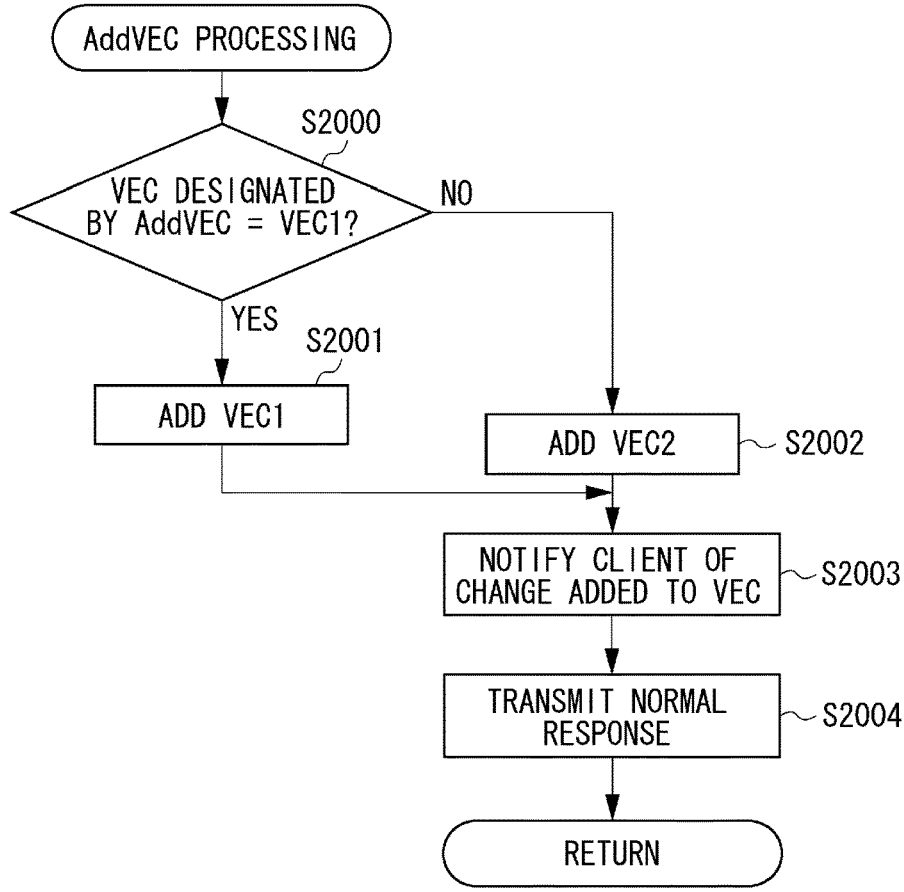
[Fig. 21]

[Fig. 22]
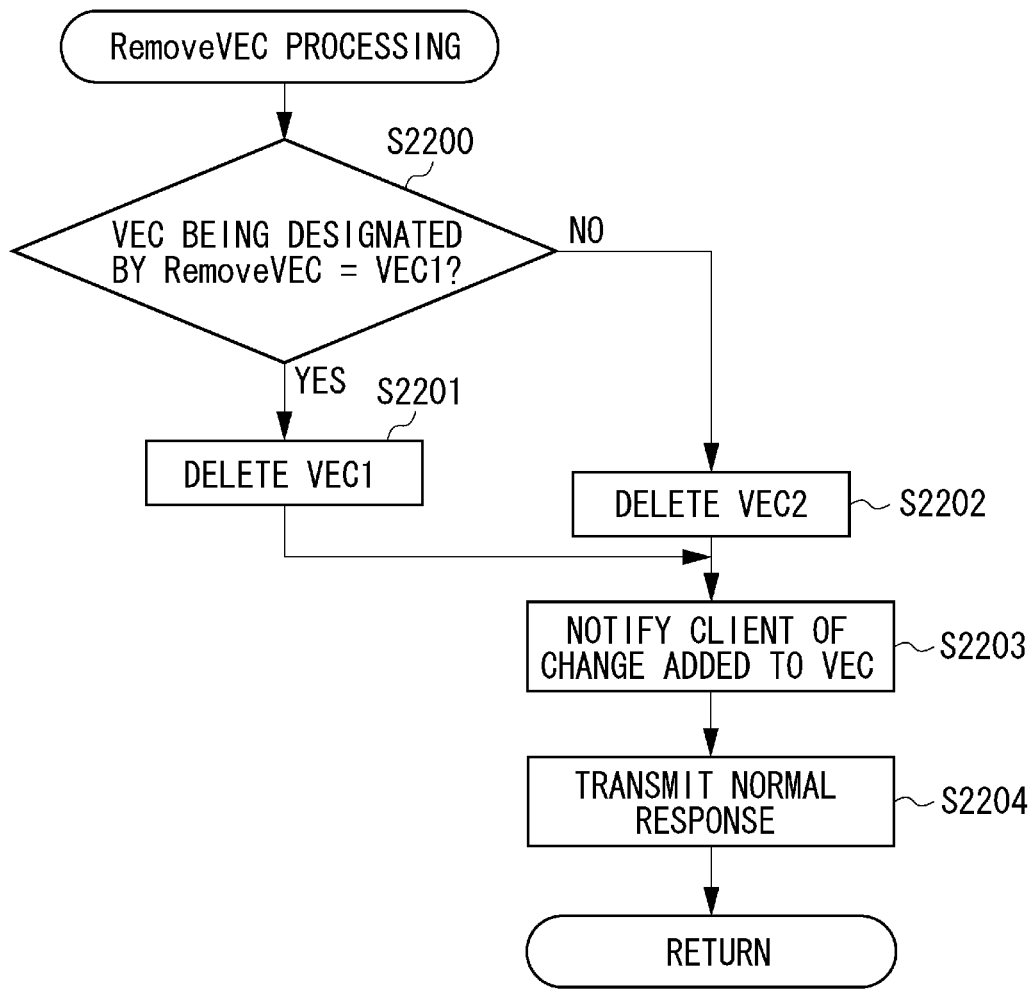

IMAGING APPARATUS AND IMAGING SYSTEM

TECHNICAL FIELD

The present invention relates to an imaging apparatus and an imaging system. More specifically, the present invention relates to a technique capable of setting a method for coding image data output from an imaging apparatus.

BACKGROUND ART

There is a conventional imaging apparatus that is capable of coding captured image data and outputting the coded image data to an external device via a network (see PTL 1). Further, there are various types of image data coding methods, in which Joint Photographic Experts Group (JPEG) and Moving Picture Experts Group Phase4 (MPEG4) are representative coding methods applicable to still images and H.264 and H.265 are representative coding methods applicable to moving images.

For example, the JPEG and H.264 coding methods can be implemented by a network camera apparatus that encodes image data according to a coding method designated by a client apparatus and performs streaming processing for distributing the coded image data to the client apparatus via a network.

Further, standard protocols are conventionally used to standardize communication interfaces when a network camera apparatus communicates with a client apparatus via a network. An example of the conventionally known standard protocols is common standards formulated by Open Network Video Interface Forum (ONVIF).

A new version of the network camera (e.g., a camera capable of operating in conformity to JPEG2000 and H.265 coding methods) will be developed in the future to satisfy the needs for increased number of pixels, enhanced image quality, and higher compression.

CITATION LIST

Patent Literature

PTL 1: Japanese Patent Application Laid-Open No. 2012-227602

SUMMARY OF INVENTION

Technical Problem

However, the method for coding still images defined by standard protocols (e.g., ONVIF) is limited to the JPEG coding method. The method for coding moving images is limited to only the MPEG4 and H.264 coding methods. The JPEG2000 and H.265 coding methods are not included in the coding methods defined by the standard protocols (e.g., ONVIF).

To solve the above-mentioned problems, the present invention is directed to an imaging apparatus that is flexibly operable in conformity to a newly introduced coding method.

Solution to Problem

According to an aspect of the present invention, an imaging apparatus according to the present invention can communicate with an external apparatus via a network. The imaging apparatus includes a storage control unit configured to cause a storage unit to store first coding method information relating to a first coding method, a first identifier associated with the first coding method information, second coding method information relating to a second coding method that is different from the first coding method, a second identifier associated with the second coding method information, and distribution setting information to which the first coding method information and the second coding method information can be added. The imaging apparatus includes a reception unit configured to receive an identification command that includes the first identifier stored in the storage unit or the second identifier stored in the storage unit from the external apparatus via the network. The imaging apparatus includes an addition unit configured to remove the first coding method information from the distribution setting information stored in the storage unit, read the second coding method information associated with the second identifier, which the identification command received by the reception unit includes, from the storage unit, and add the read second coding method information to the distribution setting information stored in the storage unit, when the identification command received by the reception unit includes the second identifier and when the first coding method information stored in the storage unit is added to the distribution setting information stored in the storage unit. Further, the imaging apparatus includes a coding unit configured to encode a captured image output from an imaging unit based on the coding method information added to the distribution setting information stored in the storage unit by the addition unit, and a distribution unit configured to distribute the captured image coded by the coding unit to the external apparatus via the network.

Further features of the present invention will become apparent from the following description of exemplary embodiments with reference to the attached drawings.

BRIEF DESCRIPTION OF DRAWINGS

FIG. 1 is a system configuration diagram illustrating a configuration of an imaging system according to a first exemplary embodiment of the present invention.

FIG. 2 is a block diagram illustrating an internal configuration of a monitoring camera that constitutes the imaging system according to the first exemplary embodiment of the present invention.

FIG. 3 is a block diagram illustrating an internal configuration of a client apparatus that constitutes a part of the imaging system according to the first exemplary embodiment of the present invention.

FIG. 4 is a block diagram illustrating an internal configuration of a client apparatus that constitutes a part of the imaging system according to the first exemplary embodiment of the present invention.

FIG. 5 is a configuration diagram of parameters that can be held by the monitoring camera according to the first exemplary embodiment of the present invention.

FIG. 6 is a command sequence diagram illustrating processing that can be performed between the monitoring camera and the client apparatus according to the first exemplary embodiment of the present invention.

FIG. 7 is a command sequence diagram illustrating processing that can be performed between the monitoring camera and the client apparatus according to the first exemplary embodiment of the present invention.

FIG. 8 is a flowchart illustrating AddVideoEncoderConfiguration reception processing that can be performed by the monitoring camera according to the first exemplary embodiment of the present invention.

FIG. 9 illustrates an example of a VideoEncoderConfiguration setting window according to the first exemplary embodiment of the present invention.

FIG. 10 illustrates another example of the VideoEncoderConfiguration setting window according to the first exemplary embodiment of the present invention.

FIG. 11 illustrates another example of the VideoEncoderConfiguration setting window according to the first exemplary embodiment of the present invention.

FIG. 12 is a configuration diagram of parameters that can be held by the monitoring camera according to the first exemplary embodiment of the present invention.

FIG. 13 illustrates a configuration example of a GetProfile command according to the first exemplary embodiment of the present invention.

FIG. 14 illustrates a configuration example of a GetProfile response according to the first exemplary embodiment of the present invention.

FIG. 15 illustrates a configuration example of an AddVideoEncoderConfiguration command according to the first exemplary embodiment of the present invention.

FIG. 16 is a table illustrating a relationship between VideoEncoderConfiguration Token and VideoEncoderConfiguration type associated with each other according to the first exemplary embodiment of the present invention.

FIG. 17 illustrates a definition example of a media profile according to the first exemplary embodiment of the present invention.

FIG. 18 illustrates a definition example of a VideoEncoderConfiguration2 command according to the first exemplary embodiment of the present invention.

FIG. 19A (collectively referred to FIG. 19 together with FIG. 19B) is a first part of a flowchart illustrating VideoEncoder setting window display processing according to the first exemplary embodiment of the present invention.

FIG. 19B (collectively referred to FIG. 19 together with FIG. 19A) is a second part of the flowchart illustrating VideoEncoder setting window display processing according to the first exemplary embodiment of the present invention.

FIG. 20 is a flowchart illustrating AddVideoEncoderConfiguration reception processing that can be performed by the monitoring camera according to a second exemplary embodiment of the present invention.

FIG. 21 is a table illustrating a relationship between VideoEncoderConfigurationToken and VideoEncoderConfiguration type associated with each other according to the second exemplary embodiment of the present invention.

FIG. 22 is a flowchart illustrating RemoveVideoEncoderConfiguration reception processing that can be performed by the monitoring camera according to the second exemplary embodiment of the present invention.

DESCRIPTION OF EMBODIMENTS

Hereinafter, the present invention will be described with reference to exemplary embodiments. Configurations described in the following exemplary embodiments are mere examples. The present invention is not limited to the illustrated configurations. Further, it is presumed that commands in the following exemplary embodiments are, for example, determined based on the Open Network VideoInterface Forum (which may be referred to as "ONVIF") standards.

Further, it is presumed that the XML Schema Definition language (which may be referred to as "XSD"), which can be used according to the ONVIF standards, is used to define data described below (e.g., VideoEncoderConfiguration2).

First Exemplary Embodiment

FIG. 1 is a system configuration diagram illustrating an imaging system that includes a monitoring camera 1000, which corresponds to a transmission apparatus, according to the present exemplary embodiment. Further, the imaging system illustrated in FIG. 1 includes two client apparatuses 2000 and 2010, each of which corresponds to a reception apparatus according to the present exemplary embodiment. The monitoring camera 1000 is connected with each of the client apparatuses 2000 and 2010 via an IP network 1500 (i.e., via a network) so that the monitoring camera 1000 can communicate with respective client apparatuses 2000 and 2010.

The imaging system according to the present exemplary embodiment is an example of a transmission and reception system. Further, the monitoring camera 1000 according to the present exemplary embodiment is an imaging apparatus that can capture moving images. More specifically, the monitoring camera 1000 is a network camera that is usable in a monitoring operation.

The IP network 1500 is, for example, constituted by a plurality of routers, switches, and cables, which satisfy communications standards such as Ethernet (registered trademark). However, the network according to the present exemplary embodiment is not limited to the IP network 1500 in terms of communications standards, scale, and configuration. For example, the IP network 1500 can be replaced by any other network via which the monitoring camera 1000 can communicate with respective client apparatuses 2000 and 2010.

More specifically, the IP network 1500 can be constituted by the internet, a wired local area network (LAN), a wireless LAN, or a wide area network (WAN). The monitoring camera 1000 according to the present exemplary embodiment can be configured to be operable in conformity to, for example, Power Over Ethernet (PoE) (registered trademark) or can be configured to be connected to a LAN cable via which electric power can be supplied.

Each of respective client apparatuses 2000 and 2010 can transmit various commands (including an imaging parameter change command, a pan-head driving command, and a video streaming start command) to the monitoring camera 1000. The monitoring camera 1000 can transmit a response replying to each command and video streaming data to the client apparatuses 2000 and 2010.

The system illustrated in FIG. 1 includes only one monitoring camera 1000 and two client apparatuses 2000 and 2010 that are connected to the IP network 1500. However, the system configuration is not limited to the above-mentioned example. For example, the above-mentioned system can include two or more monitoring cameras and three or more client apparatuses.

FIG. 2 is a block diagram illustrating an internal configuration of the monitoring camera 1000 according to the present exemplary embodiment. The monitoring camera 1000 illustrated in FIG. 2 includes a control unit 1001 that can perform various controls to be realized by the monitoring camera 1000. The control unit 1001 can be constituted, for example, by a central processing unit (CPU).

The monitoring camera 1000 further includes a storage unit 1002, which is usable as a program storing area capable of storing programs that can be executed by the control unit 1001, a work area when the control unit 1001 executes each program, a storing area for an image captured by an imaging unit 1003 described below, or any other data storing area.

The monitoring camera 1000 further includes the imaging unit 1003 that can convert an analog signal into digital data. For example, when an image of a target object is captured by an imaging optical system of the monitoring camera 1000, the imaging unit 1003 can output digital data representing the captured image to the storage unit 1002. The monitoring camera 1000 further includes a compression coding unit 1004. The imaging unit 1003 according to the present exemplary embodiment includes an image sensor, such as a charge-coupled device (CCD) sensor or a Complementary Metal Oxide Semiconductor (CMOS) sensor.

The compression coding unit 1004 can generate image data by performing compression coding processing on the captured image having been output from the imaging unit 1003 based on a coding method designated by the client apparatus 2000 or 2010. The compression coding unit 1004 can output the generated image data to the storage unit 1002. In this case, the compression coding unit 1004 causes the control unit 1001 to generate a VIDEO transmission trigger to notify a processing result indicating that distributable image data has been output to the storage unit 1002.

In the present exemplary embodiment, the compression coding unit 1004 of the monitoring camera 1000 is operable according to three types of (e.g., JPEG, H.264, and H.265) coding methods. Therefore, the monitoring camera 1000 according to the present exemplary embodiment is operable in conformity to a SetVideoEncoderConfiguration command (which may be simply referred to as "SetVEC command" in the following description) that corresponds to an existing coding method setting, such as JPEG or H.264.

The SetVEC command corresponds to a first coding method setting command.

Further, the monitoring camera 1000 according to the present exemplary embodiment is operable in conformity to a SetVideoEncoderConfiguration2 command that corresponds to an H.265 coding method other than JPEG, MPEG, and H.264 coding methods. The SetVideoEncoderConfiguration2 command may be simply referred to as "SetVEC2 command" in the following description.

Further, the SetVEC2 command is in conformity to JPEG, MPEG, H.264, and H.264ProgressiveHighProfile (which may be simply referred to as "H.264PHP") coding methods. The SetVEC2 command corresponds to a second coding method setting command Further, the monitoring camera 1000 is operable in conformity to a GetVideoEncoderConfiguration (which may be simply referred to as "GetVEC") command. Further, the monitoring camera 1000 is operable in conformity to a GetVideoEncoderConfiguration2 (which may be simply referred to as "GetVEC2") command Further, the monitoring camera 1000 is operable in conformity to a GetVideoEncoderConfigurations (which may be simply referred to as "GetVECs") command. Further, the monitoring camera 1000 is operable in conformity to a GetVideoEncoderConfigurations2 (which may be simply referred to as "GetVECs2") command Further, the monitoring camera 1000 is operable in conformity to a GetCompatibleVideoEncoderConfigurations (which may be simply referred to as "GetCVECs") command. Further, the monitoring camera 1000 is operable in conformity to a GetCompatibleVideoEncoderConfigurations2 (which may be simply referred to as "GetCVECs2") command Further, the monitoring camera 1000 is operable in conformity to a GetVideoEncoderConfigurationOptions (which may be simply referred to as "GetVECOs") command. Further, the monitoring camera 1000 is operable in conformity to a GetVideoEncoderConfigurationOptions2 (which may be simply referred to as "GetVECOs2") command In the present exemplary embodiment, coding method information (setting information) VideoEncoderConfiguration including a coding method, such as JPEG, MPEG-4, or H.264 may be conveniently referred to as "VEC1" in the following description. Further, setting information that can include new coding method information (e.g., H.264ProgressiveHighProfile or H.265) other than the existing coding methods may be conveniently referred to as "VEC2" in the following description.

The setting information VEC2 can include JPEG, MPEG-4, and H.264 having been set according to the SetVEC2 command. In the following description, the setting information VEC1 and the setting information VEC2 are collectively referred to as "VEC". Further, vec0 and vec1 represent VEC1 Token and VEC2 Token, respectively. In other words, each of vec0 and vec1 is ConfigurationToken of the setting information VEC.

A communication unit 1005 can receive a control command from an external device and can transmit a stream including a response replying to the received control command and image data to the external device. Each of the client apparatuses 2000 and 2010 according to the present exemplary embodiment is an example of the external device. Further, the communication unit 1005 according to the present exemplary embodiment corresponds to a distribution unit configured to distribute image data output from the compression coding unit 1004.

An imaging control unit 1006 can be used to control a tilt mechanism, a pan mechanism, and a zoom mechanism according to a tilt angle value, a pan angle value, and a zoom magnification value, respectively, when these values are input from the control unit 1001. Further, the imaging control unit 1006 can periodically provide PTZ Position information to the control unit 1001. The PTZ Position information indicates the present values of the pan angle, the tilt angle, and the zoom magnification. To this end, the imaging control unit 1006 sets a PTZPosition transmission flag.

Further, the imaging control unit 1006 can provide PTZ Status information to the control unit 1001. The PTZ Status information indicates present operating statuses of the tilt, pan, and zoom mechanisms. To this end, the imaging control unit 1006 sets a PTZStatus transmission flag.

Each of the compression coding unit 1004 and the imaging control unit 1006 according to the present exemplary embodiment can be constituted by a sub CPU. Further, each of the tilt mechanism, the pan mechanism, and the zoom mechanism according to the present exemplary embodiment includes a stepping motor and gears. Further, each of the tilt mechanism, the pan mechanism, and the zoom mechanism is an example of a changing unit configured to change the position of the imaging unit 1003.

FIG. 3 is a block diagram illustrating an internal configuration of the client apparatus 2000 according to the present exemplary embodiment. The client apparatus 2000 illustrated in FIG. 3 includes a control unit 2001 (e.g., a CPU) that can perform various controls to be realized by the client apparatus 2000. The client apparatus 2000 further includes a storage unit 2002, which is usable as a program storing area capable of storing programs that can be executed by the control unit 2001, a work area when the control unit 2001 executes each program, or any other data storing area.

The client apparatus 2000 further includes a display unit 2003 that can be constituted, for example, by a liquid crystal display (LCD) device or an organic electroluminescence (EL) display device. The display unit 2003 can display various setting screens, a viewer of a video image received from the monitoring camera 1000, and various messages, for a user of the client apparatus 2000. The various setting screens include a VideoEncoder setting window described below.

The client apparatus 2000 further includes an input unit 2004, which can be constituted, for example, by various buttons, a cross-key, a touch panel, and a mouse. The input unit 2004 allows a user to perform a screen operation and notifies the control unit 2001 of user operation contents. The client apparatus 2000 further includes a decoding unit 2005 that can decode compression coded image data received via a communication unit 2006 and develops the decoded image data in the storage unit 2002.

In the present exemplary embodiment, the JPEG and H.264 image decoding methods can be implemented by the decoding unit 2005 of the client apparatus 2000. Therefore, the client apparatus 2000 according to the present exemplary embodiment is operable in conformity to only the SetVEC command, which corresponds to the existing (e.g., JPEG and H.264) coding methods, and is not operable in conformity to the SetVEC2 command The communication unit 2006 is usable when the client apparatus 2000 transmits each control command to the monitoring camera 1000 and when the client apparatus 2000 receives a response replying to each control command and a stream including image data from the monitoring camera 1000. The decoding unit 2005 according to the present exemplary embodiment is, for example, constituted by a sub CPU.

FIG. 4 is a block diagram illustrating an internal configuration of the client apparatus 2010 according to the present exemplary embodiment. As illustrated in FIG. 4, the client apparatus 2010 according to the present exemplary embodiment includes various processing blocks that are similar to those of the client apparatus 2000 illustrated in FIG. 3, except for a decoding unit 2015.

More specifically, the client apparatus 2010 includes a control unit 2011 that is similar to the control unit 2001. The client apparatus 2010 includes a storage unit 2012 that is similar to the storage unit 2002. Further, the client apparatus 2010 includes a display unit 2013 that is similar to the display unit 2003. The client apparatus 2010 includes an input unit 2014 that is similar to the input unit 2004. The client apparatus 2010 includes a communication unit 2016 that is similar to the communication unit 2006.

The decoding unit 2015 illustrated in FIG. 4 can decode compression coded image data received via the communication unit 2016 and can develop the decoded image data in the storage unit 2012.

The JPEG, H.264, H.264PHP, and H.265 image decoding methods can be implemented by the decoding unit 2015 according to the present exemplary embodiment. Therefore, the client apparatus 2010 according to the present exemplary embodiment is operable in conformity to each of the SetVEC command and the SetVEC2 command. Further, the client apparatus 2010 according to the present exemplary embodiment is operable in conformity to GetVEC, GetVEC2, GetVECs, GetVECs2, GetVECOs, GetVECOs2, GetCVEC, and GetCVEC2 commands The internal configurations of the monitoring camera 1000 and respective client apparatuses 2000 and 2010 have been described with reference to FIGS. 1 to 4. The processing blocks illustrated in the drawings are preferred examples and can be modified appropriately in such a way as to constitute the monitoring camera and the client apparatus according to the present invention. For example, the monitoring camera and the client apparatus can be configured to include an audio input unit or an audio output unit, or can be modified and changed in various ways within the scope of the present invention.

Subsequently, names and contents of commands and parameters that can be used in the present exemplary embodiment will be described in detail below with reference to FIG. 5. FIG. 5 illustrates a parameter structure that can be held by the monitoring camera 1000 (more specifically, the storage unit 1002) according to the present exemplary embodiment.

The parameter structure illustrated in FIG. 5 includes three media profiles 3000, 3001, and 3002, each of which is a parameter set that stores various setting items of the monitoring camera 1000 while associating them with each other. In the following description, MP stands for the media profile. Each of respective parameter sets MPs 3000, 3001, and 3002 holds a parameter ProfileToken as ID information about each parameter set MP.

Further, each of the media profiles 3000, 3001, and 3002 holds links to various setting items. The various setting items include VideoSourceConfiguration 3011 and VideoEncoderConfigurations 3020, 3021, and 3031. In the following description, "VSC" stands for the VideoSourceConfiguration.

The parameter structure illustrated in FIG. 5 includes a parameter assembly VideoSource 3010 that represents the performance of the imaging unit 1003 provided in the monitoring camera 1000. In the following description, "VS" stands for the parameter assembly VideoSource. Further, the "VS" according to the present exemplary embodiment corresponds to image sensor setting information relating to the settings of the image sensor.

In the present exemplary embodiment, the parameter assembly VS 3010 includes a plurality of parameters, such as VideoSourceToken representing ID information about the parameter assembly VS 3010 and Resolution designating a resolution of a captured image that the imaging unit 1003 can output.

The parameter assembly VSC 3011 includes VideoSourceToken of the parameter assembly VS 3010. Thus, the parameter assembly VSC 3011 can associate the parameter assembly VS 3010 provided in the monitoring camera 1000 with respective parameter sets MPs 3000, 3001, and 3002.

In the present exemplary embodiment, the parameter assembly VSC 3011 includes

Resolution designating a resolution of a captured image that the imaging unit 1003 can output. Further, the parameter assembly VSC 3011 includes Bounds that designates a portion to be extracted from a captured image output from the imaging unit 1003 and to be distributed to the client apparatus 2000.

The parameter structure illustrated in FIG. 5 includes setting information VECs 3020, 3021, and 3031, each of which is a parameter assembly that associates image data compression coding related encoder settings with the corresponding parameter set MP.

The monitoring camera 1000 performs compression coding processing on a captured image output from the imaging unit 1003 based on the setting information VEC, with reference to the contents of the parameter assemblies VS and VSC, and distributes the compression coded image data to the client apparatuses 2000 and 2010 via the communication unit 1005. More specifically, the compression coding unit 1004 generates image data by encoding the captured image according to the parameters (e.g., coding method, frame rate, and resolution) having been set by the setting information VEC.

Parameters of the JPEG and H.264 coding methods (i.e., a part of the parameters of the coding methods that can be implemented by the compression coding unit 1004) can be held by either the setting information VEC1 or the setting information VEC2 of the storage unit 1002. On the other hand, parameters of the H.265 coding method can be held only by the setting information VEC2.

The setting information VEC includes ConfigurationToken that represents ID information about the setting information VEC, Encoding that designates a compression coding method, and Resolution that designates a resolution of an output image. Further, the setting information VEC includes Quality that designates a compression coding quality, FramerateLimit that designates a maximum frame rate of the output image, and BitrateLimit that designates a maximum bit rate.

The parameter structure illustrated in FIG. 5 includes a storage area 3040 dedicated to the setting information VEC1 and a storage area 3041 dedicated to the setting information VEC2. The setting information VEC2 can be defined by ProfileExtension2, as illustrated in FIG. 17. Further, the setting information VEC2 is excellent in expandability because a parameter EncodingProfile included in the setting information VEC2 can by designated using a string format as described in detail below with reference to FIG. 18.

FIG. 6 is a command sequence diagram illustrating typical processing, which can be performed between the monitoring camera 1000 and the client apparatus 2010, to set a MediaProfile required to distribute a video image. In the present exemplary embodiment, a transaction is constituted by a pair of a request (or a command) and a response replying to the request (or the command) For example, the client apparatus 2010 transmits a request (or a command) to the monitoring camera 1000. When the monitoring camera 1000 receives the request (or the command), the monitoring camera 1000 transmits a response replying to the request (or the command) to the client apparatus 2010.

In the present exemplary embodiment, the client apparatus 2010 includes the decoding unit 2015 that corresponds to the H.265 decoder as described above. Further, the client apparatus 2010 is operable in conformity to both of the SetVEC and SetVEC2 commands. Further, the storage unit 2012 of the client apparatus 2010 includes the VEC1 storage area 3040 and the VEC2 storage area 3041.

A transaction T4000 in FIG. 6 is a transaction relating to network device connection. The client apparatus 2010 transmits a Probe command for connecting a network device, by unicast or multicast, to the IP network 1500.

On the other hand, the monitoring camera 1000, which is connected to the IP network 1500, transmits a ProbeMatch response to the client apparatus 2000. The ProbeMatch response indicates that the monitoring camera 1000 is in a command acceptable state.

A transaction T4001 is a transaction relating to a Subscribe command, through which the client apparatus 2010 can instruct the monitoring camera 1000 to perform event distribution processing.

A transaction T4002 is a transaction relating to a GetProfiles command, through which the client apparatus 2010 can acquire a MediaProfile that corresponds to a distribution profile. In the present exemplary embodiment, the MediaProfile is a parameter set that stores various setting items of the monitoring camera 1000 while associating them with each other.

The various setting items include ProfileToken (i.e., ID information about the MediaProfile), parameter assembly VSC, setting information VEC, and audio encoder. Further, the MediaProfile holds links to respective setting items. Accordingly, the media profile corresponds to distribution setting information.

More specifically, the client apparatus 2010 transmits a GetProfiles request to the monitoring camera 1000. If the monitoring camera 1000 receives the GetProfiles request, the monitoring camera 1000 transmits a GetProfiles response including a MediaProfile list to the client apparatus 2010. The MediaProfile list corresponds to the parameter sets MPs 3000, 3001, and 3002 illustrated in FIG. 5.

Through this transaction, the client apparatus 2010 acquires the MediaProfile list that the monitoring camera 1000 can presently use in addition to the parameter ProfileToken corresponding to distribution profile ID usable to identify the MediaProfile. The client apparatus 2010 can identify the MediaProfile (i.e., distribution profile settings that are distributable and are presently held in the monitoring camera 1000) with reference to the distribution profile ID.

A transaction T4003 is a transaction relating to a GetVideoSources command, through which the client apparatus 2010 can acquire a VideoSource list that is held in the monitoring camera 1000 based on the GetVideoSources command.

In the present exemplary embodiment, the parameter assembly VideoSource represents the performance of the imaging unit 1003 provided in the monitoring camera 1000. Further, the parameter assembly VideoSource includes VideoSourceToken representing ID information about VideoSource and Resolution indicating a resolution of a captured image that can be output from the imaging unit 1003.

The client apparatus 2010 transmits a GetVideoSources request to the monitoring camera 1000. If the monitoring camera 1000 receives the GetVideoSources request, the monitoring camera 1000 transmits a GetVideoSources response replying to the received request to the client apparatus 2010.

A transaction T4004 is a transaction relating to a GetVideoSourceConfigurations command, through which the client apparatus 2010 can acquire a VideoSourceConfiguration list that is held in the monitoring camera 1000.

More specifically, the client apparatus 2010 transmits a GetVideoSourceConfigurations request to the monitoring camera 1000. If the monitoring camera 1000 receives the GetVideoSourceConfigurations request, the monitoring camera 1000 transmits a GetVideoSourceConfigurations response replying to the received request to the client apparatus 2010. More specifically, the GetVideoSourceConfigurations response includes a list that stores ID information about the parameter assembly VSC held by the monitoring camera 1000.

A transaction T4055 is a transaction relating to the GetVECs2 command More specifically, the client apparatus 2010 transmits a GetVECs2 request. If the monitoring camera 1000 receives the GetVECs2 request, the monitoring camera 1000 transmits a GetVECs2 response replying to the received request to the client apparatus 2010. The GetVECs2 response includes setting information about the JPEG, H.264, and H.265 coding methods.

Upon receiving the GetVECs2 request, the monitoring camera 1000 can recognize the client apparatus 2010 as a client apparatus that holds a new command set.

On the other hand, it is now assumed that the client apparatus 2010 uses the existing system command (such as GetVEC command) In this case, the monitoring camera 1000 cannot determine whether the client apparatus 2010 is a client apparatus that holds an old command set or a client apparatus that holds a new command set.

A transaction T4056 is a transaction relating to a GetVideoEncoderConfigurationOptions2 command, through which the client apparatus 2010 can acquire choices and setting value ranges of respective parameters that can be received by the monitoring camera 1000 with respect to the setting information VEC2 designated based on the ID information.

More specifically, the client apparatus 2010 transmits a GetVideoEncoderConfigurationOptions2 request to the monitoring camera 1000. If the monitoring camera 1000 receives the GetVideoEncoderConfigurationOptions2 request, the monitoring camera 1000 transmits a GetVideoEncoderConfigurationOptions2 response replying to the received request. Through this transaction, the client apparatus 2010 acquires a list including compression coding setting ID information stored in the storage unit 1002 from the monitoring camera 1000.

A transaction T4007 is a transaction relating to a CreateProfile command, through which the client apparatus 2010 can request a creation of a distribution profile. More specifically, the client apparatus 2010 transmits a CreateProfile request to the monitoring camera 1000. If the monitoring camera 1000 receives the CreateProfile request, the monitoring camera 1000 transmits a CreateProfile response replying to the received request.

Through this transaction, the client apparatus 2010 can newly create a distribution profile in the monitoring camera 1000 and can obtain ID information about the created distribution profile. Further, the monitoring camera 1000 stores the newly created distribution profile.

More specifically, the control unit 1001 newly creates a MediaProfile according to the CreateProfile request received by the communication unit 1005 and performs storage control processing for causing the storage unit 1002 to store the created MediaProfile.

After completing the command processing in this transaction, the monitoring camera 1000 transmits a MediaProfile change notification event to the client apparatus 2010. The MediaProfile change notification event notifies the client apparatus 2010 of the change having occurred in the MediaProfile.

A transaction T4008 is a transaction relating to an AddVideoSourceConfiguration command, through which the client apparatus 2010 can request an addition of a parameter assembly VSC. More specifically, the client apparatus 2010 transmits an AddVideoSourceConfiguration request to the monitoring camera 1000.

If the monitoring camera 1000 receives the AddVideoSourceConfiguration request, the monitoring camera 1000 transmits an AddVideoSourceConfiguration response replying to the received request to the client apparatus 2010.

In this transaction, the client apparatus 2010 designates the distribution profile ID acquired in the transaction T4007 and the ID information about the parameter assembly VSC acquired in the transaction T4004. Thus, the client apparatus 2010 can associate a desired parameter assembly VSC corresponding to the designated VSC identification information with the MediaProfile corresponding to the designated distribution profile ID. A transaction T4059 is a transaction relating to an AddVideoEncoderConfiguration command, through which the client apparatus 2010 can request an addition of coding information (VEC). More specifically, the client apparatus 2010 transmits an AddVEC request to the monitoring camera 1000. If the monitoring camera 1000 receives the AddVEC request, the monitoring camera 1000 transmits an AddVEC response replying to the received request to the client apparatus 2010.

In this transaction, the client apparatus 2010 designates the distribution profile ID acquired in the transaction T4007 and the ID information about the setting information VEC acquired in the transaction T4055. Thus, the client apparatus 2010 can associate a VEC setting corresponding to the designated VEC identification information with the MediaProfile corresponding to the designated distribution profile ID.

On the other hand, the monitoring camera 1000 stores the MediaProfile that corresponds to the distribution profile ID designated by the client apparatus 2010 and the VEC setting that corresponds to the ID information about the setting information VEC designated by the client apparatus 2010 while associating them with each other. If the setting information VEC is VEC1, the monitoring camera 1000 stores the MediaProfile and the VEC setting in the first storage area 3040. If the setting information VEC is VEC2, the monitoring camera 1000 stores the MediaProfile and the VEC setting in the second storage area 3041.

A transaction T4060 is a transaction relating to the SetVideoEncoderConfiguration2 command, through which the client apparatus 2010 can set each parameter of the setting information VEC2. More specifically, the client apparatus 2010 transmits a SetVideoEncoderConfiguration2 request to the monitoring camera 1000.

The SetVideoEncoderConfiguration2 command according to the present exemplary embodiment corresponds to the second coding method setting command If the monitoring camera 1000 receives the SetVEC2 request, the monitoring camera 1000 transmits a SetVEC2 response replying to the received request. Through the transaction T4060, the client apparatus 2010 can set the contents of the setting information VEC2 acquired in the transaction T4055 based on the choices acquired in the transaction T4056. For example, the client apparatus 2010 changes the compression coding method and the cutting size. The monitoring camera 1000 stores the contents of the compression coding settings having been set as described above.

A transaction T4011 is a transaction relating to a GetStreamUri command, through which the client apparatus 2010 can request an acquisition of a distribution address. Through the transaction T4011, the client apparatus 2010 designates the distribution profile ID acquired in the transaction T4007 and acquires address (URI) information required to acquire image data to be distributed in the streaming processing based on the designated distribution profile settings.

The monitoring camera 1000 transmits the parameter assembly VSC associated with the distribution profile ID designated by the client apparatus 2010, together with the address information required to perform streaming distribution processing for the image data that corresponds to the VEC contents, to the client apparatus 2010.

A transaction T4012 is a transaction relating to a DESCRIBE action, through which the client apparatus 2010 can request an acquisition of distribution information. More specifically, the client apparatus 2010 transmits a DESCRIBE command to the monitoring camera 1000. If the monitoring camera 1000 receives the DESCRIBE command, the monitoring camera 1000 transmits a DESCRIBE response replying to the received command to the client apparatus 2010.

In the transaction T4012, the client apparatus 2010 requests and acquires information about the contents of the streaming distribution processing to be performed by the monitoring camera 1000, by executing the DESCRIBE command using the URI information acquired in the transaction T4011.

A transaction T4013 is a transaction relating to a SETUP action, through which the client apparatus 2010 can request distribution settings. More specifically, the client apparatus 2010 transmits a SETUP command to the monitoring camera 1000. If the monitoring camera 1000 receives the SETUP command, the monitoring camera 1000 transmits a SETUP response replying to the received command to the client apparatus 2010.

In the transaction T4013, the client apparatus 2010 causes the monitoring camera 1000 to prepare for the streaming processing based on detailed data relating to the distribution information acquired in the transaction T4012. Executing this command enables the client apparatus 2010 and the monitoring camera 1000 to share the transmission method for the stream that includes a session number.

A transaction T4014 is a transaction relating to a PLAY action, through which the client apparatus 2010 can cause the monitoring camera 1000 to start the streaming distribution processing. More specifically, the client apparatus 2010 transmits a PLAY command to the monitoring camera 1000. If the monitoring camera 1000 receives the PLAY command, the monitoring camera 1000 transmits a PLAY response replying to the received command to the client apparatus 2010.

When the client apparatus 2010 transmits the PLAY command to the monitoring camera 1000, the client apparatus 2010 can request the monitoring camera 1000 to start the streaming processing while designating the session number acquired in the transaction T4013.

A transaction T4015 is the distribution of a stream from the monitoring camera 1000 to the client apparatus 2010. In response to the start instruction requested in the transaction T4014, the monitoring camera 1000 distributes the stream according to the transmission method shared in the transaction T4013.

A transaction T4016 is a transaction relating to a TEARDOWN action, though which the client apparatus 2010 can cause the monitoring camera 1000 to stop the distribution processing. More specifically, the client apparatus 2010 transmits a TEARDOWN command to the monitoring camera 1000. If the monitoring camera 1000 receives the TEARDOWN command, the monitoring camera 1000 transmits a TEARDOWN response replying to the received command In the transaction T4016, the client apparatus 2010 can request the monitoring camera 1000 to stop the streaming processing by executing the TEARDOWN command, while designating the session number acquired through the transaction T4013.

As mentioned above, the typical command sequence described with reference to FIGS. 1 to 6 is an example of the processing that can be performed by the monitoring camera 1000, in which the H.265 coding method can be implemented, in response to a reception of the VEC2 command in a case where the monitoring camera 1000 is operable in conformity to both of the setting information VEC1 and the setting information VEC2.

The typical command sequence illustrated in FIG. 6 is the processing for setting a MediaProfile required to distribute a video image between the client apparatus 2010 and the monitoring camera 1000.

In the present exemplary embodiment, a typical command sequence for setting a MediaProfile, which is required to distribute a video image, between the client apparatus 2000 and the monitoring camera 1000 is basically similar to the above-mentioned command sequence. Therefore, a different part of the command sequence for the client apparatus 2000 and the monitoring camera 1000 will be mainly described below with reference to FIG. 6 and redundant description thereof will be avoided.

In the command sequence for the client apparatus 2000 and the monitoring camera 1000, the GetVEC2 transaction T4055 illustrated in FIG. 6 is replaced with a GetVEC transaction. Through this transaction, the client apparatus 2000 can acquire a list of setting information VEC held by the monitoring camera 1000. The client apparatus 2000 transmits a GetVEC request to the monitoring camera 1000.

If the monitoring camera 1000 receives the GetVEC request, the monitoring camera 1000 transmits a GetVEC response replying to the received request. The GetVEC response includes JPEG and H.264 image compression methods and does not include the H.265 method. Further, the GetVEC response includes a list including ID information about coding settings stored in the storage unit 1002.

In the command sequence for the client apparatus 2000 and the monitoring camera 1000, the GetVECOs2 transaction T4056 illustrated in FIG. 6 is replaced by a GetVECOs transaction. Through the this transaction, the client apparatus 2000 can acquire choices and setting value ranges of respective parameters that can be received by the monitoring camera 1000 with respect to the setting information VEC designated based on the ID information.

The client apparatus 2000 transmits a GetVECOs request to the monitoring camera 1000. If the monitoring camera 1000 receives the GetVECOs request, the monitoring camera 1000 transmits a GetVECOs response replying to the received request.

Through this transaction, the client apparatus 2000 can acquire a list including ID information about coding settings stored in the storage unit 1002 from the monitoring camera 1000. Further, the GetVECOs response includes information about the JPEG and H.264 methods and does not include information about the H.265 method.

In the command sequence for the client apparatus 2000 and the monitoring camera 1000, the SetVEC2 transaction T4060 illustrated in FIG. 6 is replaced by a SetVEC transaction. Through this transaction, the client apparatus 2000 can set each parameter of the setting information VEC. The client apparatus 2000 transmits a SetVEC request to the monitoring camera 1000.

If the monitoring camera 1000 receives the SetVEC request, the monitoring camera 1000 transmits a SetVEC response replying to the received request. Through this transaction, the client apparatus 2000 can set the contents of the setting information VEC acquired through the GetVEC transaction based on the choices acquired in the GetVECOs transaction. For example, the client apparatus 2000 changes the compression coding method and the cutting size. The monitoring camera 1000 stores the contents of the compression coding settings having been set as described above.

After completing the processing in this transaction, the monitoring camera 1000 transmits a VEC change notification event to the client apparatus 2000. The VEC change notification event notifies the client apparatus 2000 of the change having occurred in the setting information VEC. The SetVEC command according to the present exemplary embodiment corresponds to the first coding method setting command FIG. 7 is a command sequence diagram illustrating typical processing, which can be performed between the monitoring camera 1000 and the client apparatus 2010, for example, to add a desired VEC setting to a desired MediaProfile. In FIG. 7, the client apparatus 2010 can acquire a MediaProfile from the monitoring camera 1000 by executing the transaction T4002 relating to GetProfiles command Further, the client apparatus 2010 can acquire all lists relating to the setting information VEC from the monitoring camera 1000 by executing the transaction T4055 relating to the GetVideoEncoderConfigurations2 command Then, the client apparatus 2010 adds a desired VEC2 (which is selected from all lists of the acquired setting information VEC) to the acquired MediaProfile, by executing the AddVEC transaction T4059.

The transaction T4055 illustrated in FIG. 7 is a transaction relating to the GetVideoEncoderConfiguration2 command, through which the client apparatus 2010 can acquire all lists relating to the setting information VEC currently set in the monitoring camera 1000.

The VEC list acquired by the client apparatus 2010, as the response in the transaction T4055, includes the setting information VEC1 3020 and 3021 and the setting information VEC2 3031 illustrated in FIG. 5. For example, the coding method applied to the setting information VEC1 3020 is H.264. The coding method applied to the setting information VEC1 3021 is JPEG. Further, the coding method applied to the setting information VEC2 3031 is H.265.

The transaction T4056 is a transaction relating to a GetVECOptions2 command, through which the client apparatus 2010 can acquire choices and setting value ranges of respective parameters that can be received by the monitoring camera 1000 with respect to the setting information VEC corresponding to the ID information designated as argument of the GetVECOptions2 command The transaction T4059 is a transaction relating to the AddVideoEncoderConfiguration command, through which the client apparatus 2010 can add the argument of the AddVideoEncoderConfiguration command and information setting VEC corresponding to the designated ID to the MediaProfile corresponding to the designated argument ProfileToken of the AddVideoEncoderConfiguration command After completing the transaction T4059, the monitoring camera 1000 transmits a VEC change notification event to the client apparatus 2010 accessible via the IP network 1500. The VEC change notification event notifies the client apparatus 2010 of the change having occurred in the setting information VEC.

To validate the setting contents of the setting information VEC added in the transaction T4059, the client apparatus 2010 causes the monitoring camera 1000 to restart the streaming distribution processing by executing each of the transactions 4016, 4012, 4013, and 4014.

FIG. 13 illustrates a configuration example of a GetProfile command according to the present exemplary embodiment. In FIG. 13, profile0 is associated with a <ProfileToken> tag. A GetProflie command including the <ProfileToken> tag, whose value is profile0, is a command to acquire parameter set MP 3000 corresponding to the tag value from the monitoring camera 1000.

FIG. 14 illustrates a configuration example of a GetProfile response according to the present exemplary embodiment. As illustrated in FIG. 14, a <trt:Proflie fixed="false"token="profile0"> tag is associated with a <tt:GetProfile Response> tag. The above-mentioned tag is associated with a <tt:Extension> tag.

Further, this tag is associated with a <tt:Extension> tag. Further, this tag is associated with a <tt:VideoEncoderConfiguration2 token="vec2"> tag indicated by a reference numeral 10000 in FIG. 14. The value of the <tt:Extension> tag, which is associated with the tag indicated by the reference numeral 10000 in FIG. 14, corresponds to a value of an expansion area of the MediaProfile.

FIG. 15 illustrates a configuration example of the AddVideoEncoderConfiguration command according to the present exemplary embodiment. In FIG. 15, a <ProfileToken> tag and a <ConfigurationToken> tag are associated with an <AddVideoEncoderConfiguration> tag, as indicated by a reference numeral 10001.

Further, profile0 is a value associated with the <ProfileToken> tag. Further, vec2 is a value associated with the <ConfigurationToken> tag. Accordingly, the command illustrated in FIG. 15 is a command to add setting information VEC2 3030, whose ConfigurationToken value is vec2, to the parameter set MP 3000 whose ProflieToken value is profile0.

The ConfigurationToken value (e.g., vec0 or vec1) of the setting information VEC1 can be associated with the <ConfigurationToken> tag of the AddVEC command Further, the ConfigurationToken according to the present exemplary embodiment corresponds to an identifier to identify the setting information VEC. Further, the AddVEC command according to the present exemplary embodiment corresponds to the identification command in which this identifier is described.

FIG. 17 illustrates a definition example of the VideoEncoderConfiguration2 command according to the present exemplary embodiment. As illustrated in FIG. 17, the setting information VEC2 is defined by ProfileExtension2, which is an expansion area of the parameter set MP.

FIG. 18 illustrates a definition example of the VideoEncoderConfiguration2 command. As illustrated in FIG. 18, the setting information VEC2 includes a sequence designator that designates sequential appearance of elements illustrated in FIG. 18 according to a defined order.

In FIG. 18, Encoding is a parameter that designates a desired coding method. Resolution is a parameter that designates a desired value of the resolution. Width is a parameter that designates a desired number of pixels horizontally disposed on the screen. Height is a parameter that designates a desired number of pixels vertically disposed on the screen.

Quality is a parameter that designates a desired level of the image quality. Further, RateControl is a parameter that designates a desired frame rate. The parameter RateControl includes FrameRateLimit, which is a parameter that designates an upper-limit value of the frame rate.

Further, the parameter RateControl includes EncodingInterval, which is a parameter that designates both coding and transmission interval. Further, the parameter RateControl includes BitrateLimit, which is a parameter that designates an upper-limit bit rate of image data to be distributed through the streaming processing.

Multicast is a parameter that designates a multicast number of the image data to be distributed through the streaming processing. Further, SessionTimeout is a parameter that designates a desired time-out time of the image data to be distributed through the streaming processing. Further, GovLength is a parameter that designates a desired interval of I frame.

Further, EncodingProfile is a parameter that designates a profile of the coding method. For example, when the coding method is H.265, the parameter EncodingProfile can designate Main, Main10, or MainStillPicture.

FIG. 8 is a flowchart illustrating Add VideoEncoderConfiguration command reception processing, which can be performed by the monitoring camera 1000 according to the present exemplary embodiment. More specifically, the control unit 1001 performs the processing illustrated in FIG. 8. Further, the control unit 1001 starts this processing when the communication unit 1005 receives the AddVEC command In step S1500, the control unit 1001 determines whether the setting information VEC that corresponds to the designated argument ConfigurationToken of the AddVEC command received by the communication unit 1005 is VEC1 or VEC2. For example, in the present exemplary embodiment, the control unit 1001 performs the determination processing in step S1500 based on a table illustrated in FIG. 16. The table illustrated in FIG. 16 is stored in the storage unit 1002.

In the table illustrated in FIG. 16, Token of VEC (ConfigurationToken) is associated with type of setting information VEC. The above-mentioned VEC type information indicates whether the setting information VEC is VEC1 or VEC2.

For example, in the table illustrated in FIG. 16, the setting information VEC having a Token value vec0 is associated with the type VEC1 of the setting information VEC. Thus, it is indicated that the type of the setting information VEC having the ConfigurationToken value vec0 is VEC1.

Further, in the table illustrated in FIG. 16, the setting information VEC having a Token value vec1 is associated with the type VEC1 of the setting information VEC. Thus, it is indicated that the type of the setting information VEC having the ConfigurationToken value vec1 is VEC1.

Further, in the table illustrated in FIG. 16, the setting information VEC having a Token value vec2 is associated with the type VEC2 of the setting information VEC. Thus, it is indicated that the type of the setting information VEC having the ConfigurationToken value vec2 is VEC2.

Further, in the table illustrated in FIG. 16, the setting information VEC having a Token value vec3 is associated with the type VEC2 of the setting information VEC. Thus, it is indicated that the type of the setting information VEC having the ConfigurationToken value vec3 is VEC2.

Then, the control unit 1001 reads the VEC type, which is associated with the designated argument ConfigurationToken of the AddVEC command received by the communication unit 1005, from the storage unit 1002.

Next, if the read type of the setting information VEC is VEC1, the control unit 1001 determines that the setting information VEC associated with the designated argument ConfigurationToken is VEC1. On the other hand, if the read type of the setting information VEC is VEC2, the control unit 1001 determines that the setting information VEC associated with the designated argument ConfigurationToken is VEC2.

If the control unit 1001 determines that the setting information VEC is VEC1 (YES in step S1500), the operation proceeds to step S1501. On the other hand, if the control unit 1001 determines that the setting information VEC is VEC2 (NO in step S1500), the operation proceeds to step S1600.

The designated argument ConfigurationToken of the AddVEC command received by the communication unit 1005 may not be present in the table illustrated in FIG. 16, which is stored in the storage unit 1002. In such a case, the control unit 1001 can instruct the communication unit 1005 to transmit information indicating the occurrence of an error, as a response to the AddVEC command received by the communication unit 1005, to the client apparatus 2000.

In step S1501, the control unit 1001 updates the setting information VEC1 of the parameter set MP corresponding to the designated argument ProfileToken of the AddVEC command received by the communication unit 1005. More specifically, the control unit 1001 updates the setting information VEC1 of the parameter set MP with setting information VEC1 corresponding to the designated argument ConfigurationToken of the above-mentioned command In step S1600, the control unit 1001 determines whether the setting information having been set (added) to the parameter set MP corresponding to the designated argument ProfileToken of the AddVEC command received by the communication unit 1005 is VEC1.

If the control unit 1001 determines that the setting information having been set (added) to the parameter set MP is VEC1 (YES in step S1600), the operation proceeds to step S1610. On the other hand, if the control unit 1001 determines that the setting information having been set (added) to the parameter set MP is not VEC1 (NO in step S1600), the operation proceeds to step S1601.

In step S1601, the control unit 1001 adds the setting information VEC2 to the parameter set MP corresponding to the designated argument ProfileToken of the AddVEC command received by the communication unit 1005. In this respect, the control unit 1001 serves as an addition unit according to the present exemplary embodiment. The setting information VEC2 to be added in this case is setting information VEC2 corresponding to the designated argument ConfigurationToken of the above-mentioned command Further, the control unit 1001 may perform processing for determining whether to delete the contents of the setting information VEC1 on a GUI display screen of the client apparatus 2010 illustrated in FIG. 11, before performing the processing.

In step S1602, the control unit 1001 instructs the communication unit 1005 to notify the client apparatuses 2000 and 2010 of the change having been added to the parameter set MP. The parameter set MP notified in this case is the parameter set MP corresponding to the designated argument ProfileToken of the AddVEC command received by the communication unit 1005.

For example, the control unit 1001 instructs the communication unit 1005 to transmit an event indicating the change having been added to the parameter set MP to the client apparatuses 2000 and 2010.

In step S1603, the control unit 1001 instructs the communication unit 1005 to transmit a normal response indicating normality of the operation, as a response replying to the AddVEC command received by the communication unit 1005, to the client apparatus 2010.

In step S1610, the control unit 1001 deletes (or removes) the setting information VEC1 from the parameter set MP corresponding to the designated argument ConfigurationToken of the AddVEC command received by the communication unit 1005.

FIGS. 9 to 11 illustrate examples of the VideoEncoder setting window according to the present exemplary embodiment, each of which is a user interface that enables a user of the client apparatus 2010 to perform a VEC setting operation for the monitoring camera 1000.

The VideoEncoder setting window illustrated in FIG. 9 includes a Live View area 7000. When the VideoEncoder setting window is opened, the client apparatus 2010 displays a moving image corresponding to the video stream obtained through the transaction T4015 in the Live View area 7000 by executing the above-mentioned sequence illustrated in FIG. 6.

Further, the client apparatus 2010 acquires all lists relating to the setting information VEC from the monitoring camera 1000 by transmitting the GetVECs2 command to the monitoring camera 1000. Then, the client apparatus 2010 displays Video Encoder setting tabs 7001, 7002, and 7003 on the screen illustrated in FIG. 9 with reference to the obtained result (i.e., the acquired lists).

The parameter set MP 3001 corresponds to the setting tab 7001. The parameter set MP 3002 corresponds to the tab 7002. The parameter set MP 3003 corresponds to the tab 7003.

Further, the client apparatus 2010 acquires the choices and the setting ranges of respective parameters of the setting information VEC by transmitting the GetVECOs command and the GetVECOs2 command. Then, the client apparatus 2010 displays the choices and setting ranges of respective VideoEncoder parameters in a VideoEncoderSetting area 7045 of the screen illustrated in FIG. 9 with reference to the obtained results (i.e., the acquired choices and the setting ranges).

Thus, the client apparatus 2010 enables a user to know setting information by causing the display unit 2013 to display the choices and the setting ranges of respective setting items of the setting information VEC.

Further, the Video Encoder setting tab 7001, the Video Encoder setting tab 7002, and the Video Encoder setting tab 7003 are examples of a VideoEncoder setting screen that can be selectively switched.

For example, when the Video Encoder setting tab 7001 is pressed by a user, a VideoEncoder1 setting screen can be displayed on the VideoEncoder setting window illustrated in FIG. 9. The VideoEncoder1 setting screen enables the user to change the setting information VEC 3021 associated with the parameter set MP 3001.

More specifically, the VideoEncoder1 setting screen, a VideoEncoder2 setting screen, and a VideoEncoder3 setting screen are usable to set the parameters of the parameter set MP created in the monitoring camera 1000.

In the present exemplary embodiment, each MediaProfile can be created in the monitoring camera 1000 in response to the CreateProfile command transmitted from an external apparatus (e.g., the client apparatus 2000 or 2010).

According to the example illustrated in FIG. 9, three media profiles created in the monitoring camera 1000 are the parameter set MP 3000, the parameter set MP 3001, and the parameter set MP 3002. The parameters corresponding to the created parameter set MP can be displayed on the setting screen of the client apparatus 2010.

In the present exemplary embodiment, a ProfileToken value of MP 3000 is profile0. Further, a ProfileToken value of MP 3001 is Profile1. Further, a ProfileToken value of MP 3002 is Profile2.

The VideoEncoder1 setting screen includes an EncoderType area 7050 that enables a user to select a desired compression coding method for the setting information VEC. The information that can be displayed in the EncoderType area 7050 when the screen illustrated in FIG. 9 is opened is choices with respect to the compression coding method (Encording) obtained by transmitting the GetVECOptions2 command In the present exemplary embodiment, the compression coding methods that are presently displayed in the EncoderType area 7050 and can be selected by a user of the client apparatus 2010 are JPEG, H.264, and H.265.

A radio button 7051, a radio button 7052, and a radio button 7053 are operable to select any one of the compression coding methods JPEG, H.264, and H.265. More specifically, the compression coding method JPEG can be selected by pressing the radio button 7051. The compression coding method H.264 can be selected by pressing the radio button 7052. The compression coding method H.265 can be selected by pressing the radio button 7053.

According to the screen illustrated in FIG. 9, each of the compression coding methods JPEG and H.265 is in a non-selected state.

For example, the coding method currently set in the setting information VEC1 of the parameter set MP 3001 is H.264. Therefore, a black dot expressing a pressed state is displayed on the radio button 7052 of the display screen illustrated in FIG. 9.

The VideoEncoder1 setting screen includes a Detail area 7020 that enables a user to select desired levels of FramerateLimit, BitrateLimit, and Quality parameters included in the setting information VEC 3021. Information that can be displayed in setting ranges 7021, 7022, and 7023 of the above-mentioned parameters, when the screen illustrated in FIG. 9 is opened, indicates contents of the setting ranges of respective parameters obtained by executing the GetVECOs command The VideoEncoder1 setting screen includes an EncoderResolution area 7030 that enables a user to select a desired value of the resolution (Resolution). The VideoEncoder1 setting screen includes a drop-down list 7031 that displays selectable resolution levels of the setting information VEC 3021 obtained by executing the GetVECOs command when the screen illustrated in FIG. 9 is opened.

The VideoEncoder1 setting screen includes a selection area 7033 that enables a user to select a desired encoder profile. A drop-down menu can be displayed in the selection area 7033 when the user clicks on a blackened down-arrow button provided on the right side thereof with the mouse. The user can select a desired encoder profile from a list displayed in the selection area 7033.

More specifically, according to the example illustrated in FIG. 9, the encoder profile being in a selected state on the drop-down menu is H.264HighProfile. In other words, the live video image can be displayed on the Live View area 7000 based on H.264HighProfile coded image data, which can be decoded by the decoding unit 2015 (of the client apparatus 2010).

FIG. 10 illustrates another example of the VideoEncoder setting window, in a state where the radio button 7053 has been pressed by a user of the client apparatus 2010 according to the present exemplary embodiment. It is now assumed that the SET button 7040 has been pressed the user on the screen illustrated in FIG. 10.

Under such an assumption, first, the client apparatus 2010 transmits the AddVEC command to the monitoring camera 1000. The AddVEC command to be transmitted in this case includes the designated argument ProfileToken that corresponds to the parameter set MP 3001. Further, the AddVEC command includes the designated argument ConfigurationToken(=vec2) that corresponds to the setting information VEC 3030.

On the other hand, if the monitoring camera 1000 receives the AddVEC command, the monitoring camera 1000 performs AddVEC reception processing. An example of the AddVEC reception processing that can be performed based on the above-mentioned assumption is described in detail below with reference to FIG. 8.

In step S1500, the control unit 1001 determines that the setting information VEC corresponding to the designated argument ConfigurationToken of the AddVEC command received by the communication unit 1005 is VEC2 (NO in step S1500). Then, the operation of the control unit 1001 proceeds to step S1600.

In step S1600, the control unit 1001 determines that the setting information having been set in the parameter set MP 3001 corresponding to the designated argument ProfileToken (=profile0) of the AddVEC command received by the communication unit 1005 is VEC1 3020 (YES in step S1600). Then, the operation of the control unit 1001 proceeds to step S1610.

In step S1610, the control unit 1001 deletes (removes) the setting information VEC1 3020 from the parameter set MP 3001 stored in the storage unit 1002.

In step S1601, the control unit 1001 adds the setting information VEC2, whose ConfigurationToken value is vec2, to the parameter set MP 3001 stored in the storage unit 1002. In this case, the setting information VEC2 corresponding to H.265MainProfile is added to the parameter set MP 3001.

In step S1602, the control unit 1001 instructs the communication unit 1005 to notify the client apparatuses 2000 and 2010 of information about the change having been added to the parameter set MP 3001. For example, the information to be notified in step S1602 includes an indication that the streaming distribution processing conforming to H.264 will be stopped and the streaming distribution processing conforming to H.265 will be started.

In step S1603, the control unit 1001 instructs the communication unit 1005 to transmit the normal response, as a response replying to the AddVEC command received from the client apparatus 2010, to the client apparatus 2010.

FIG. 19 is a flowchart illustrating VideoEncoder setting window display processing, which can be performed by the client apparatus 2010 according to the present exemplary embodiment. The control unit 2011 performs the processing illustrated in FIG. 19.

In step S1700, the control unit 2011 instructs the communication unit 2016 to execute the GetProfiles transaction T4002. Through the GetProfiles transaction T4002, the control unit 2011 acquires all MediaProfile lists being presently set in the monitoring camera 1000 via the communication unit 2016. The control unit 2011 causes the storage unit 2012 to store the acquired lists.

In step S1701, the control unit 2011 instructs the communication unit 2016 to execute the GetVECs2 transaction T4055. Through the GetVECs2 transaction T4055, the control unit 2011 acquires all lists relating to the setting information VEC2 being presently set in the monitoring camera 1000 via the communication unit 2016. The control unit 2011 causes the storage unit 2012 to store the acquired lists.

In step S1702, the control unit 2011 instructs the communication unit 2016 to execute the GetVECOs transaction and the GetVECOs2 transaction T4056. Through these transactions, the control unit 2011 acquires information about image quality, frame rate, bit rate, and selectable range and choices of each EncordingInterval, which the monitoring camera 1000 supports (conforms to).

In step S1703, the control unit 2011 instructs the display unit 2013 to display the VideoEncoder setting window illustrated in FIG. 9 based on the setting information and the selectable range of the monitoring camera 1000 acquired in steps S1700 to S1702.

In step S1704, the control unit 2011 determines whether the VEC change notification indicating the change having occurred in the setting information VEC has been received by the communication unit 2006. Then, if the control unit 2011 determines that the VEC change notification has been received by the communication unit 2016 (YES in step S1704), the operation proceeds to step S1705. If the control unit 2011 determines that the VEC change notification has not been received by the communication unit 2016 (NO in step S1704), the operation returns to step S1700.

In step S1705, the control unit 2011 instructs the display unit 2013 to display each of the SET button 7040 and the CLOSE button 7041 in an active state so that the user can press these buttons.

In step S1706, the control unit 2011 determines whether the SET button 7040 has been pressed by the user based on the notification received from the input unit 2014.

Then, if the control unit 2011 determines that the SET button 7040 has been pressed by the user (YES in step S1706), the operation proceeds to step S1710. On the other hand, if the control unit 2011 determines that the SET button 7040 has not been pressed by the user (NO in step S1706), the operation proceeds to step S1715.

If the control unit 2011 determines that the CLOSE button 7041 has been pressed by the user based on the notification received from the input unit 2014, the operation returns to step S1700.

In step S1710, the control unit 2011 determines whether the changed VEC contents on the VideoEncoder setting window illustrated in FIG. 9 include the deletion of the setting information VEC1.

Then, if the control unit 2011 determines that the changed VEC contents on the VideoEncoder setting window include the deletion of the setting information VEC1 (YES in step S1710), the operation proceeds to step S1711. On the other hand, if the control unit 2011 determines that the changed VEC contents on the VideoEncoder setting window do not include the deletion of the setting information VEC1 (NO in step S1710), the operation proceeds to step S1714.

In step S1711, the control unit 2011 instructs the display unit 2013 to display an Alert message indicating that the setting information VEC1 will be deleted. In this respect, the control unit 2011 has a display control function. The Alert message prompts the user to determine whether to permit the deletion of the setting information VEC1.

In step S1712, the control unit 2011 determines whether an EXECUTE button 7061 or a BACK button 7062 has been pressed based on the notification received from the input unit 2014. Then, if the control unit 2011 determines that the EXECUTE button 7061 has been pressed (YES in step S1712), the operation proceeds to step S1713. If the control unit 2011 determines that the BACK button 7062 has been pressed (NO in step S1712), the operation returns to step S1700.

In step S1714, the control unit 2011 instructs the communication unit 2016 to transmit the SetVEC command including the VEC contents changed on the VideoEncoder setting window illustrated in FIG. 9 to the client apparatus 2000.

In step S1715, the control unit 2011 determines whether the CLOSE button 7041 has been pressed based on the notification received from the input unit 2014. Then, if the control unit 2011 determines that the CLOSE button 7041 has been pressed (YES in step S1715), the operation proceeds to step S1716. On the other hand, if the control unit 2011 determines that the CLOSE button 7041 has not been pressed (NO in step S1715), the control unit 2011 repeats the processing in step S1715.

In step S1716, the control unit 2011 instructs the display unit 2013 to close (hide) the VideoEncoder setting window illustrated in FIG. 9.

FIG. 12 illustrates a parameter structure in a state where the processing illustrated in FIG. 19 has been completed by the monitoring camera 1000 according to the present exemplary embodiment. The parameter structure illustrated in FIG. 12 is similar to the parameter structure illustrated in FIG. 5 and redundant description thereof will be avoided.

The parameter set MP 3000 illustrated in FIG. 12 does not include the setting information VEC1 3020 that corresponds to the H.264 setting information (coding method information). Instead, the parameter set MP 3000 includes the setting information VEC2 3030 corresponding to the H.265 setting information, which has been newly added. In other word, the deleted setting information VEC1 3020 has been replaced by the newly added H.265 setting information.

As mentioned above, in the present exemplary embodiment, by the AddVEC command, the monitoring camera 1000 that is operable in conformity to a new coding method can be added the setting information VEC2, which is the coding information including the new coding method (e.g., H.265), from the client apparatus 2010 that is operable in conformity to the new coding method.

The monitoring camera 1000 deletes the setting information VEC1 when the above-mentioned addition processing has been completed, to stop distributing the stream of the setting information VEC1 (e.g., the distribution of the H.264 stream). Further, the monitoring camera 1000 notifies the change having been added to the setting information VEC.

Thus, it becomes feasible to prevent a situation where a stream is not appropriately distributed without any reason in a state where the setting information VEC1 is present in the parameter set MediaProfile, when seen from the client apparatus 2000 (i.e., an older client apparatus). In this case, it is useful that the monitoring camera 1000 transmits text data to the older client apparatus so that an adequate message, e.g., "a non-defined coding method has been set", may be displayed on a display screen of the older client.

Further, in a case where the setting information VEC2 (i.e., the coding information including the new coding method) is added according to the AddVEC command, deleting the setting information VEC1 can prevent any inconsistency from occurring when seen from the older client apparatus. However, the present invention is not limited to the above-mentioned example.

For example, it is now assumed that the SetVEC2 command (corresponding to a second coding method information setting command) and the AddVEC command (corresponding to a coding information addition command) have been received by the monitoring camera apparatus. Under such an assumption, the coding method included in the command coding information may be one of JPEG, MPEG-4, and H.264 that are supported by the existing Onvvif command In such a case, it is useful to cause a first storage unit to store the setting information VEC2 without writing it in a second storage unit. On the other hand, if the coding method included in the command coding information is H.265 that is not supported by the existing Onvif command, it is useful to cause the second storage unit to store the setting information VEC2.

Further, in the present exemplary embodiment, the control unit 1001 is configured to delete (remove) the setting information VEC1 from the parameter set MP corresponding to the designated argument ProfileToken of the AddVEC command received by the communication unit 1005 (see step S1610). However, the processing to be performed in step S1610 is not limited to the above-mentioned contents.

For example, the control unit 1001 can be configured to temporarily store the contents of the setting information VEC1 and delete the stored contents at appropriate timing (e.g., step S1601, step S1602, or Play command transaction T4014).

Further, the apparatus or the system according to the present exemplary embodiment can solve the following problems. Specifically, according to the presently defined ONVIF standards, the coding method applied to still images is limited to the JPEG coding method and the coding method applied to moving images is limited to only the MPEG4 and H.264 coding methods. The JPEG2000 and H.265 coding methods are not included in the coding methods defined by the ONVIF standards. Accordingly, it is necessary to provide new commands to set such a non-defined coding method.

For example, a presently available Onvif command that adds a change to the setting information VEC (i.e., one of entities associated with the parameter set MediaProfile) is the SetVEC command. In addition to the above-mentioned command, the SetVEC2 command is necessary as a command to set a new coding method. However, it is not desired that the command system becomes complicated. In this respect, it is desired to suppress the number of newly added commands and effectively use the existing commands.

However, the existing commands do not conform to a new coding method. The usage of existing commands may cause an inconsistency in system implementation. The present exemplary embodiment can solve the above-mentioned problems.

Further, the parameter set MP according to the present exemplary embodiment includes the area in which the setting information VEC1 is described and the expansion area in which the setting information VEC2 is described. Further, describing the setting information VEC2 in the expansion area of the parameter set MP is excellent in backward compatibility.

Second Exemplary Embodiment

Subsequently, a second exemplary embodiment of the present invention will be described. FIG. 20 is a flowchart illustrating AddVideoEncoderConfiguration command reception processing, which can be performed by the monitoring camera 1000 according to the present exemplary embodiment. More specifically, the control unit 1001 performs the processing illustrated in FIG. 20. Further, the control unit 1001 starts the above-mentioned processing when the communication unit 1005 receives the AddVEC command. The processing illustrated in FIG. 20 corresponds to the processing illustrated in FIG. 8 described in the first exemplary embodiment.

In step S2000, the control unit 1001 determines whether the setting information VEC corresponding to the designated argument ConfigurationToken of the AddVEC command received by the communication unit 1005 is VEC1 or VEC2. For example, in the present exemplary embodiment, the control unit 1001 performs the determination processing in step S2000 with reference to a table illustrated in FIG. 21. The storage unit 1002 stores the table illustrated in FIG. 21.

In the table illustrated in FIG. 21, Token of VEC (ConfigurationToken) is associated with the type of setting information VEC. The VEC type information indicates whether the setting information VEC is VEC1 or VEC2.

For example, in the table illustrated in FIG. 21, the setting information VEC having a Token value vec0 is associated with the type VEC1 of the setting information VEC. Thus, it is indicated that the type of the setting information VEC having the ConfigurationToken value vec0 is VEC1.

Further, in the table illustrated in FIG. 21, the setting information VEC having a Token value vec1 is associated with the type VEC1 of the setting information VEC. Thus, it is indicated that the type of the setting information VEC having the ConfigurationToken value vec1 is VEC1.

Further, in the table illustrated in FIG. 21, the setting information VEC having a Token value vec2 is associated with the type VEC2 of the setting information VEC. Thus, it is indicated that the type of the setting information VEC having the ConfigurationToken value vec2 is VEC2.

Further, in the table illustrated in FIG. 21, the setting information VEC having a Token value vec3 is associated with the type VEC2 of the setting information VEC. Thus, it is indicated that the type of the setting information VEC having the ConfigurationToken value vec3 is VEC2.

Then, the control unit 1001 reads the VEC type, which is associated with the designated argument ConfigurationToken of the AddVEC command received by the communication unit 1005, from the storage unit 1002.

Next, if the read type of the setting information VEC is VEC1, the control unit 1001 determines that the setting information VEC associated with the designated argument ConfigurationToken is VEC1. On the other hand, if the read type of the setting information VEC is VEC2, the control unit 1001 determines that the setting information VEC associated with the designated argument ConfigurationToken is VEC2.

If the control unit 1001 determines that the setting information VEC is VEC1 (YES in step S2000), the operation proceeds to step S2001. On the other hand, if the control unit 1001 determines that the setting information VEC is VEC2 (NO in step S2000), the operation proceeds to step S2002.

The designated argument ConfigurationToken of the AddVEC command received by the communication unit 1005 may not be present in the table illustrated in FIG. 21, which is stored in the storage unit 1002. In such a case, the control unit 1001 may instruct the communication unit 1005 to transmit error information, as a response replying to the AddVEC command received by the communication unit 1005, to the client apparatus 2000.

In step S2001, the control unit 1001 updates (describes) the setting information VEC1 of the parameter set MP corresponding to the designated argument ProfileToken of the AddVEC command received by the communication unit 1005. More specifically, the control unit 1001 updates the setting information VEC1 of the parameter set MP with the setting information VEC1 corresponding to the designated argument ConfigurationToken of the above-mentioned command Accordingly, the control unit 1001 according to the present exemplary embodiment can be regarded as having a description processing function capable of describing the above-mentioned setting information VEC1 in the parameter set MP.

In step S2002, the control unit 1001 (which serves as the addition unit) adds the setting information VEC2 to the parameter set MP corresponding to the designated argument ProfileToken of the AddVEC command received by the communication unit 1005. The setting information VEC2 to be added in this case is VEC2 corresponding to the designated argument ConfigurationToken of the above-mentioned command In step S2003, the control unit 1001 instructs the communication unit 1005 to notify the client apparatuses 2000 and 2010 of the change having been added to the parameter set MP. The parameter set MP in this case is the parameter set MP corresponding to the designated argument ProfileToken of the AddVEC command received by the communication unit 1005.

For example, the control unit 1001 instructs the communication unit 1005 to transmit an event indicating the change added to the parameter set MP to the client apparatuses 2000 and 2010.

In step S2004, the control unit 1001 instructs the communication unit 1005 to transmit a normal response indicating normality of the operation, as a response replying to the AddVEC command received by the communication unit 1005, to the client apparatus 2010.

FIG. 22 is a flowchart illustrating RemoveVideoEncoderConfiguration reception processing, which can be performed by the monitoring camera 1000 according to the present exemplary embodiment. The control unit 1001 performs the processing illustrated in FIG. 22. Further, the control unit 1001 starts the above-mentioned processing when the communication unit 1005 receives a RemoveVEC command In step S2200, the control unit 1001 determines whether the setting information VEC corresponding to the designated argument ConfigurationToken of the RemoveVEC command received by the communication unit 1005 is VEC1 or VEC2.

Then, the control unit 1001 reads the VEC type, which is associated with the designated argument ConfigurationToken of the RemoveVEC command received by the communication unit 1005, from the storage unit 1002.

Next, if the read type of the setting information VEC is VEC1, the control unit 1001 determines that the setting information VEC associated the designated argument ConfigurationToken is VEC1. On the other hand, if the read type of the setting information VEC is VEC2, the control unit 1001 determines that the setting information VEC associated with the designated argument ConfigurationToken is VEC2.

Then, if the control unit 1001 determines that the setting information VEC is VEC1 (YES in step S2200), the operation proceeds to step S2201. On the other hand, if the control unit 1001 determines that the setting information VEC is VEC2 (NO in step S2200), the operation proceeds to step S2202.

In step S2201, the control unit 1001 deletes (removes) the setting information VEC1 from the parameter set MP corresponding to the designated argument ProfileToken of the RemoveVEC command received by the communication unit 1005. The setting information VEC1 to be deleted in this case is VEC1 corresponding to the designated argument ConfigurationToken of the above-mentioned command Accordingly, the control unit 1001 according to the present exemplary embodiment can be regarded as having a deletion processing function capable of deleting the above-mentioned setting information VEC1 from the parameter set MP.

In step S2202, the control unit 1001 deletes (removes) the setting information VEC2 from the parameter set MP corresponding to the designated argument ProfileToken of the RemoveVEC command received by the communication unit 1005. The setting information VEC2 to be deleted in this case is VEC2 corresponding to the designated argument ConfigurationToken of the above-mentioned command In step S2203, the control unit 1001 instructs the communication unit 1005 to notify the client apparatuses 2000 and 2010 of the change having been added to the parameter set MP. The parameter set MP in this case is the parameter set MP corresponding to the designated argument ProfileToken of the RemoveVEC command received by the communication unit 1005.

For example, the control unit 1001 instructs the communication unit 1005 to transmit an event indicating that change added to the parameter set MP to the client apparatuses 2000 and 2010.

In step S2204, the control unit 1001 instructs the communication unit 1005 to transmit a normal response indicating normality of the operation, as a response replying to the RemoveVEC command received by the communication unit 1005, to the client apparatus 2010.

An example of the AddVEC reception processing that can be performed based on the above-mentioned assumption will be described in detail below with reference to the above-mentioned FIG. 20.

In step S2000, the control unit 1001 determines that the setting information VEC corresponding to the designated argument ConfigurationToken of the AddVEC command received by the communication unit 1005 is VEC2 (NO in step S2000). Then, the operation of the control unit 1001 proceeds to step S2002.

In step S2002, the control unit 1001 adds the setting information VEC2 having the ConfigurationToken value vec2 to the parameter set MP 3001 stored in the storage unit 1002. In this case, the setting information VEC2 corresponding to H.265MainProfile is added to the parameter set MP 3001.

In step S2003, the control unit 1001 instructs the communication unit 1005 to notify the client apparatuses 2000 and 2010 of the change having been added the parameter set MP 3001. For example, the information to be notified in this case indicates that the streaming distribution processing conforming to H.264 is stopped and the streaming distribution processing conforming to H.265 is newly started.

In step S2004, the control unit 1001 instructs the communication unit 1005 to transmit the normal response, as a response replying to the AddVEC command received from the client apparatus 2010, to the client apparatus 2010.

As mentioned above, the monitoring camera 1000 according to the present exemplary embodiment stores the table in which ConfigurationToken of VEC is associated with the type of VEC.

Further, the monitoring camera 1000 reads the setting information VEC corresponding to the designated argument ConfigurationToken of the AddVEC command received by the communication unit 1005 from the table. Further, the monitoring camera 1000 describes the read setting information VEC in the MediaProfile stored in the storage unit 1002.

Thus, it becomes feasible to conform to a coding method not supported by the existing Onvif commands without adding new commands, such as AddVEC2 command (request/response) and RemoveVEC2 command (request/response). As a result, it becomes feasible to use a lesser number of commands to conform to the coding method not supported by the existing Onvif commands.

Although the above-mentioned exemplary embodiments have been described with reference to image coding methods, the present exemplary embodiments can be applied to audio coding methods.

Representative commands relating to the audio coding methods include SetAudioEncoderConfiguraition2 and GetAudioEncoderConfiguration2. Further, the above-mentioned commands include GetAudiuoDecoderConfiguration2 and GetAudioCompatibleOutputConfiguration2.

Further, according to the present exemplary embodiment, the following problems can be solved. Specifically, the coding methods presently defined by the ONVIF standards are limited to JPEG, MPEG4, and H.264. The JPEG2000 and H.265 coding methods are not defined by the ONVIF standards. Accordingly, it becomes necessary to provide new commands to set such a non-defined coding method.

For example, a presently available Onvif command that adds a change to the VideoEncoderConfiguration corresponding to such a coding method is the SetVideoEncoderConfiguration command. However, a new command (e.g., SetVideoEncoderConfiguration2) becomes necessary to set a new coding method.

Further, coding method setting information associated with ID information about the ConfigurationToken of the new SetVideoEncoderConfiguration2 command is allocated to the second storage unit. In the present exemplary embodiment, the second storage unit is different from the first storage unit to which the existing SetVideoEncoderConfiguration command is allocated.

Similarly, the GetVideoEncoderConfiguration2 command becomes necessary. It is not desired to increase the number of newly added commands. In this respect, it is desired to effectively use the available commands without adding new commands. However, the existing commands do not conform to a new coding method. The usage of existing commands may cause an inconsistency in system implementation.

The Add VideoEncoderConfiguration command and a RemoveVideoEncoderConfiguration command are existing commands that are usable in such cases. The AddVideoEncoderConfiguration command is usable to add VideoEncoderConfiguration to MediaProfile.

Further, the RemoveVideoEncoderConfiguration command is usable to delete VideoEncoderConfiguration from MediaProfile.

However, using an existing command makes it difficult to identify VideoEncoderConfiguration to be added (or deleted) according to the command. For example, it is difficult to determine whether the added VideoEncoderConfiguration has been set according to the SetVideoEncoderConfiguration command Similarly, it is difficult to determine whether the added VideoEncoderConfiguration has been set according to the SetVideoEncoderConfiguration2 command. The present exemplary embodiment can solve the above-mentioned problems.

Further, the present invention is not limited to the above-mentioned configuration according to which both the setting information VEC1 and the setting information VEC2 can be included in one parameter set MP. For example, it is useful to reflect the setting information VEC1 or VEC2 included in a predetermined parameter set MP to the setting information of another parameter set MP.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)(trademark)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-029835, filed Feb. 19, 2014, and No 2014-029837, filed Feb. 19, 2014, which are hereby incorporated by reference herein in their entirety.

The invention claimed is:

1. An imaging apparatus which is capable of communicating with an external apparatus via a network, wherein the imaging apparatus is capable of encoding image data using a plurality of encoding methods including a first encoding method and a second encoding method, and wherein the imaging apparatus transmits, to the external apparatus, encoded image data encoded by using one of the plurality of encoding methods, the imaging apparatus comprising:
a reception unit configured to receive, from the external apparatus, a request command which requests encoding method information which indicates an encoding method which the imaging apparatus is capable of using;
a determination unit configured to determine whether the request command received by the reception unit is for a first command set or a second command set, wherein the first command set is a command set which is capable of using the first and second encoding methods, and wherein the second command set is a command set which is capable of using the first encoding method and is not capable of using the second encoding method; and
a transmission unit configured to transmit, to the external apparatus, the encoding method information in response to the request command received by the reception unit,
wherein the transmission unit is configured:
to transmit encoding method information which indicates the first and second encoding methods, if the determination unit determines that the request command received by the reception unit is for the first command set; and
to transmit encoding method information which indicates the first encoding method and not to transmit encoding method information which indicates the second encoding method, if the determination unit determines that the request command received by the reception unit is for the second command set.

2. The imaging apparatus according to claim 1, wherein the first encoding method includes H.264, and the second encoding method includes H.265.

3. The imaging apparatus according to claim 1, wherein the request command is GetVideoEncoderConfiguration.

4. The imaging apparatus according to claim 1, wherein the determination unit is configured to determine whether the request command received by the reception unit is for the first command set or the second command set, based on description of a command received by the reception unit.

5. An imaging control method of an imaging apparatus which is capable of communicating with an external apparatus via a network, wherein the imaging apparatus is capable of encoding image data using a plurality of encoding methods including a first encoding method and a second encoding method, and wherein the imaging apparatus transmits, to the external apparatus, encoded image data encoded by using one of the plurality of encoding methods, the imaging control method comprising:
receiving, from the external apparatus, a request command which requests encoding method information which indicates an encoding method which the imaging apparatus is capable of using;
determining whether the request command received is for a first command set or a second command set, wherein the first command set is a command set which is capable of using the first and second encoding methods, and wherein the second command set is a command set which is capable of using the first encoding method and is not capable of using the second encoding method; and
transmitting, to the external apparatus, the encoding method information in response to the request command received,
wherein encoding method information which indicates the first and second encoding methods is transmitted, if it is determined that the request command received is for the first command set; and
encoding method information which indicates the first encoding method is transmitted and not to transmit encoding method information which indicates the second encoding method, if it is determined that the request command received is for the second command set.

6. A non-transitory computer-readable storage medium storing a program comprising instructions which, when the program is executed by a computer, cause the computer to carry out an imaging control method of an imaging apparatus which is capable of communicating with an external apparatus via a network, wherein the imaging apparatus is capable of encoding image data using a plurality of encoding methods including a first encoding method and a second encoding method, and wherein the imaging apparatus transmits, to the external apparatus, encoded image data encoded by using one of the plurality of encoding methods, the imaging control method comprising:
receiving, from the external apparatus, a request command which requests encoding method information which indicates an encoding method which the imaging apparatus is capable of using;
determining whether the request command received is for a first command set or a second command set, wherein the first command set is a command set which is capable of using the first and second encoding methods, and wherein the second command set is a command set which is capable of using the first encoding method and is not capable of using the second encoding method; and transmitting, to the external apparatus, the encoding method information in response to the request command received, wherein encoding method information which indicates the first and second encoding methods is transmitted, if it is determined that the request command received is for the first command set; and encoding method information which indicates the first encoding method is transmitted and not to transmit encoding method information which indicates the second encoding method, if it is determined that the request command received is for the second command set.

* * * * *